(12) United States Patent (10) Patent No.: US 12,650,593 B2

Bamberger et al. (45) Date of Patent: *Jun. 9, 2026

(54) REDUCING BOOT TIME AND POWER CONSUMPTION IN DISPLAYING DATA CONTENT

(71) Applicant: Snap Inc., Santa Monica, CA (US)

(72) Inventors: Alex Bamberger, Venice, CA (US); Peter Brook, Marina del Rey, CA (US); Nicolas Dahlquist, Venice, CA (US); Matthew Hanover, Los Angeles, CA (US); Russell Douglas Patton, Playa Vista, CA (US); Jonathan M Rodriguez, II, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,739

(22) Filed: Nov. 11, 2024

(65) Prior Publication Data

US 2025/0067977 A1 Feb. 27, 2025

Related U.S. Application Data

(63) Continuation of application No. 18/137,295, filed on Apr. 20, 2023, now Pat. No. 12,164,105, which is a (Continued)

(51) Int. Cl.
 *G02B 27/01* (2006.01)
 *G02C 11/00* (2006.01)
 (Continued)

(52) U.S. Cl.
 CPC .............. *G02B 27/01* (2013.01); *G02C 11/10* (2013.01); *G06F 1/163* (2013.01); *G06F 1/32* (2013.01);
 (Continued)

(58) Field of Classification Search
 CPC ...... H04N 23/631; H04N 23/64; H04N 23/65; H04N 23/651; H04N 23/66; H04N 23/661;
 (Continued)

(56) References Cited

U.S. PATENT DOCUMENTS

| | | | |
|---|---|---|---|
| 666,223 | A | 1/1901 | Shedlock |
| 4,581,634 | A | 4/1986 | Williams |

(Continued)

FOREIGN PATENT DOCUMENTS

| | | | |
|---|---|---|---|
| CA | 2887596 A1 | 7/2015 | |
| EP | 2051480 A1 | 4/2009 | |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Twyler L Haskins
*Assistant Examiner* — Akshay Trehan
(74) *Attorney, Agent, or Firm* — Schwegman Lundberg & Woessner, P.A.

(57) ABSTRACT

One aspect disclosed is a method including determining a location from a positioning system receiver, determining, using a hardware processor and the location, that the location is approaching a path of direction of visual direction information, displaying the visual direction information on a display of a wearable device in response to the determining, determining, using the positioning system receiver, whether the turn of the visual direction information has been made, determining, by the hardware processor, a first period of time for display of the content data based on whether the turn of the visual direction information has been made, (Continued)

powering on the display and displaying, using the display, content data for the first period of time, turning off the display and the hardware processor following display of the content data.

20 Claims, 11 Drawing Sheets

Related U.S. Application Data continuation of application No. 17/661,596, filed on May 2, 2022, now Pat. No. 11,662,576, which is a continuation of application No. 17/249,048, filed on Feb. 18, 2021, now Pat. No. 11,320,651, which is a continuation of application No. 16/288,041, filed on Feb. 27, 2019, now Pat. No. 10,948,717, which is a continuation of application No. 15/926,906, filed on Mar. 20, 2018, now Pat. No. 10,261,313, which is a continuation of application No. 15/620,260, filed on Jun. 12, 2017, now Pat. No. 9,946,067, which is a continuation of application No. 14/744,832, filed on Jun. 19, 2015, now Pat. No. 9,678,338, which is a continuation of application No. 14/665,964, filed on Mar. 23, 2015, now Pat. No. 9,692,967.

(51) Int. Cl.
| | |
|---|---|
| *G06F 1/16* | (2006.01) |
| *G06F 1/32* | (2019.01) |
| *G06F 1/3203* | (2019.01) |
| *G06F 1/3206* | (2019.01) |
| *G06F 1/3287* | (2019.01) |
| *G06F 1/3293* | (2019.01) |
| *H04N 5/76* | (2006.01) |
| *H04N 23/60* | (2023.01) |
| *H04N 23/63* | (2023.01) |
| *H04N 23/65* | (2023.01) |
| *H04N 23/66* | (2023.01) |
| *H04N 23/661* | (2023.01) |

(52) U.S. Cl.
CPC .......... *G06F 1/3203* (2013.01); *G06F 1/3206* (2013.01); *G06F 1/3287* (2013.01); *G06F 1/3293* (2013.01); *H04N 23/631* (2023.01); *H04N 23/64* (2023.01); *H04N 23/651* (2023.01); *H04N 23/66* (2023.01); *H04N 23/661* (2023.01); *G02B 27/017* (2013.01); *G02B 2027/0178* (2013.01); *H04N 5/76* (2013.01); *Y02D 10/00* (2018.01); *Y02D 30/50* (2020.08)

(58) Field of Classification Search
CPC ........ H04N 5/76; G02B 27/01; G02B 27/017; G02B 2027/0178; G02C 11/10; G06F 1/163; G06F 1/32; G06F 1/3203; G06F 1/3206; G06F 1/3287; G06F 1/3293; Y02D 10/00; Y02D 30/50
See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |

(56) References Cited

U.S. PATENT DOCUMENTS

| | | | |
|---|---|---|---|
| 7,546,554 B2 | 6/2009 | Chiu et al. | |
| 7,607,096 B2 | 10/2009 | Oreizy et al. | |
| 7,639,943 B1 | 12/2009 | Kalajan | |
| 7,650,231 B2 | 1/2010 | Gadler | |
| 7,668,537 B2 | 2/2010 | DeVries | |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,161,115 B2 | 4/2012 | Yamamoto | |
| 8,161,417 B1 | 4/2012 | Lee | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,234,350 B1 | 7/2012 | Gu et al. | |
| 8,276,092 B1 | 9/2012 | Narayanan et al. | |
| 8,279,319 B2 | 10/2012 | Date | |
| 8,280,406 B2 | 10/2012 | Ziskind et al. | |
| 8,285,199 B2 | 10/2012 | Hsu et al. | |
| 8,287,380 B2 | 10/2012 | Nguyen et al. | |
| 8,301,159 B2 | 10/2012 | Hamynen et al. | |
| 8,306,922 B1 | 11/2012 | Kunal et al. | |
| 8,312,086 B2 | 11/2012 | Velusamy et al. | |
| 8,312,097 B1 | 11/2012 | Siegel et al. | |
| 8,326,315 B2 | 12/2012 | Phillips et al. | |
| 8,326,327 B2 | 12/2012 | Hymel et al. | |
| 8,332,475 B2 | 12/2012 | Rosen et al. | |
| 8,352,546 B1 | 1/2013 | Dollard | |
| 8,379,130 B2 | 2/2013 | Forutanpour et al. | |
| 8,385,950 B1 | 2/2013 | Wagner et al. | |
| 8,402,097 B2 | 3/2013 | Szeto | |
| 8,405,773 B2 | 3/2013 | Hayashi et al. | |
| 8,418,067 B2 | 4/2013 | Cheng et al. | |
| 8,423,409 B2 | 4/2013 | Rao | |
| 8,471,914 B2 | 6/2013 | Sakiyama et al. | |
| 8,472,935 B1 | 6/2013 | Fujisaki | |
| 8,510,383 B2 | 8/2013 | Hurley et al. | |
| 8,527,345 B2 | 9/2013 | Rothschild et al. | |
| 8,549,205 B1 | 10/2013 | Harriman et al. | |
| 8,554,627 B2 | 10/2013 | Svendsen et al. | |
| 8,560,612 B2 | 10/2013 | Kilmer et al. | |
| 8,594,680 B2 | 11/2013 | Ledlie et al. | |
| 8,613,089 B1 | 12/2013 | Holloway et al. | |
| 8,660,358 B1 | 2/2014 | Bergboer et al. | |
| 8,660,369 B2 | 2/2014 | Llano et al. | |
| 8,660,793 B2 | 2/2014 | Ngo et al. | |
| 8,682,350 B2 | 3/2014 | Altman et al. | |
| 8,718,333 B2 | 5/2014 | Wolf et al. | |
| 8,724,622 B2 | 5/2014 | Rojas | |
| 8,732,168 B2 | 5/2014 | Johnson | |
| 8,744,523 B2 | 6/2014 | Fan et al. | |
| 8,745,132 B2 | 6/2014 | Obradovich | |
| 8,761,800 B2 | 6/2014 | Kuwahara | |
| 8,768,876 B2 | 7/2014 | Shim et al. | |
| 8,775,972 B2 | 7/2014 | Spiegel | |
| 8,788,680 B1 | 7/2014 | Naik | |
| 8,790,187 B2 | 7/2014 | Walker et al. | |
| 8,797,415 B2 | 8/2014 | Arnold | |
| 8,798,646 B1 | 8/2014 | Wang et al. | |
| 8,856,349 B2 | 10/2014 | Jain et al. | |
| 8,874,677 B2 | 10/2014 | Rosen et al. | |
| 8,886,227 B2 | 11/2014 | Schmidt et al. | |
| 8,898,496 B1 * | 11/2014 | Chi | G06F 3/012 |
| | | | 455/574 |
| 8,909,679 B2 | 12/2014 | Root et al. | |
| 8,909,725 B1 | 12/2014 | Sehn | |
| 8,934,045 B2 * | 1/2015 | Karn | H04N 23/66 |
| | | | 348/333.13 |
| 8,972,357 B2 | 3/2015 | Shim et al. | |
| 8,995,433 B2 | 3/2015 | Rojas | |
| 9,015,285 B1 | 4/2015 | Ebsen et al. | |
| 9,020,745 B2 | 4/2015 | Johnston et al. | |
| 9,040,574 B2 | 5/2015 | Wang et al. | |
| 9,055,416 B2 | 6/2015 | Rosen et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,119,027 B2 | 8/2015 | Sharon et al. | |
| 9,123,074 B2 | 9/2015 | Jacobs et al. | |
| 9,143,382 B2 | 9/2015 | Bhogal et al. | |
| 9,143,681 B1 | 9/2015 | Ebsen et al. | |
| 9,152,477 B1 | 10/2015 | Campbell et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,258,459 B2 | 2/2016 | Hartley | |
| 9,344,606 B2 | 5/2016 | Hartley et al. | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,439,041 B2 | 9/2016 | Parvizi et al. | |
| 9,443,227 B2 | 9/2016 | Evans et al. | |
| 9,450,907 B2 | 9/2016 | Pridmore et al. | |
| 9,459,778 B2 | 10/2016 | Hogeg et al. | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,628,950 B1 | 4/2017 | Noeth et al. | |
| 9,678,338 B1 | 6/2017 | Bamberger et al. | |
| 9,692,967 B1 | 6/2017 | Bamberger et al. | |
| 9,710,821 B2 | 7/2017 | Heath | |
| 9,854,219 B2 | 12/2017 | Sehn | |
| 9,946,067 B1 | 4/2018 | Bamberger et al. | |
| 10,261,313 B1 | 4/2019 | Bamberger et al. | |
| 11,320,651 B2 | 5/2022 | Bamberger et al. | |
| 2002/0047868 A1 | 4/2002 | Miyazawa | |
| 2002/0078456 A1 | 6/2002 | Hudson et al. | |
| 2002/0087631 A1 | 7/2002 | Sharma | |
| 2002/0097257 A1 | 7/2002 | Miller et al. | |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2003/0001846 A1 | 1/2003 | Davis et al. | |
| 2003/0016247 A1 | 1/2003 | Lai et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0037124 A1 | 2/2003 | Yamaura et al. | |
| 2003/0052925 A1 | 3/2003 | Daimon et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0148773 A1 | 8/2003 | Spriestersbach et al. | |
| 2003/0164856 A1 | 9/2003 | Prager et al. | |
| 2003/0229607 A1 | 12/2003 | Zellweger et al. | |
| 2004/0027371 A1 | 2/2004 | Jaeger | |
| 2004/0064429 A1 | 4/2004 | Hirstius et al. | |
| 2004/0078367 A1 | 4/2004 | Anderson et al. | |
| 2004/0111467 A1 | 6/2004 | Willis | |
| 2004/0158739 A1 | 8/2004 | Wakai et al. | |
| 2004/0189465 A1 | 9/2004 | Capobianco et al. | |
| 2004/0203959 A1 | 10/2004 | Coombes | |
| 2004/0215625 A1 | 10/2004 | Svendsen et al. | |
| 2004/0243531 A1 | 12/2004 | Dean | |
| 2004/0243688 A1 | 12/2004 | Wugofski | |

(56) References Cited

U.S. PATENT DOCUMENTS

| | | |
|---|---|---|
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0284876 A1 | 12/2006 | Low et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0141051 A1* | 6/2008 | Lee ..................... G06F 1/3209 |
| | | 713/323 |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0199173 A1* | 8/2008 | Inoue ..................... G03B 17/14 |
| | | 396/213 |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0189981 A1 | 7/2009 | Siann et al. |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0251558 A1* | 10/2009 | Park ..................... H04N 23/651 |
| | | 348/222.1 |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0118180 A1* | 5/2010 | Matsushita .......... H04N 23/651 |
| | | 348/372 |
| 2010/0130233 A1 | 5/2010 | Parker |
| 2010/0131880 A1 | 5/2010 | Lee et al. |
| 2010/0131895 A1 | 5/2010 | Wohlert |
| 2010/0141762 A1* | 6/2010 | Siann ................... H04N 23/661 |
| | | 348/372 |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |

(56)　　　　　References Cited

U.S. PATENT DOCUMENTS

| | | | |
|---|---|---|---|
| 2010/0201482 A1 | 8/2010 | Robertson et al. | |
| 2010/0201536 A1 | 8/2010 | Robertson et al. | |
| 2010/0214436 A1 | 8/2010 | Kim et al. | |
| 2010/0223128 A1 | 9/2010 | Dukellis et al. | |
| 2010/0223343 A1 | 9/2010 | Bosan et al. | |
| 2010/0250109 A1 | 9/2010 | Johnston et al. | |
| 2010/0257196 A1 | 10/2010 | Waters et al. | |
| 2010/0259386 A1 | 10/2010 | Holley et al. | |
| 2010/0271490 A1 | 10/2010 | Jung et al. | |
| 2010/0273509 A1 | 10/2010 | Sweeney et al. | |
| 2010/0281045 A1 | 11/2010 | Dean | |
| 2010/0306669 A1 | 12/2010 | Della Pasqua | |
| 2011/0004071 A1 | 1/2011 | Faiola et al. | |
| 2011/0010205 A1 | 1/2011 | Richards | |
| 2011/0029512 A1 | 2/2011 | Folgner et al. | |
| 2011/0040783 A1 | 2/2011 | Uemichi et al. | |
| 2011/0040804 A1 | 2/2011 | Peirce et al. | |
| 2011/0050909 A1 | 3/2011 | Ellenby et al. | |
| 2011/0050915 A1 | 3/2011 | Wang et al. | |
| 2011/0064388 A1 | 3/2011 | Brown et al. | |
| 2011/0066743 A1 | 3/2011 | Hurley et al. | |
| 2011/0083101 A1 | 4/2011 | Sharon et al. | |
| 2011/0102630 A1 | 5/2011 | Rukes | |
| 2011/0119133 A1 | 5/2011 | Igelman et al. | |
| 2011/0137881 A1 | 6/2011 | Cheng et al. | |
| 2011/0145564 A1 | 6/2011 | Moshir et al. | |
| 2011/0159890 A1 | 6/2011 | Fortescue et al. | |
| 2011/0164163 A1 | 7/2011 | Bilbrey et al. | |
| 2011/0165890 A1 | 7/2011 | Ho et al. | |
| 2011/0197194 A1 | 8/2011 | D'Angelo et al. | |
| 2011/0202598 A1 | 8/2011 | Evans et al. | |
| 2011/0202968 A1 | 8/2011 | Nurmi | |
| 2011/0211534 A1 | 9/2011 | Schmidt et al. | |
| 2011/0213845 A1 | 9/2011 | Logan et al. | |
| 2011/0215966 A1 | 9/2011 | Kim et al. | |
| 2011/0221656 A1* | 9/2011 | Haddick | H04N 5/44 |
| | | | 345/156 |
| 2011/0225048 A1 | 9/2011 | Nair | |
| 2011/0238763 A1 | 9/2011 | Shin et al. | |
| 2011/0255736 A1 | 10/2011 | Thompson et al. | |
| 2011/0273575 A1 | 11/2011 | Lee | |
| 2011/0282799 A1 | 11/2011 | Huston | |
| 2011/0283188 A1 | 11/2011 | Farrenkopf | |
| 2011/0296222 A1 | 12/2011 | Tan et al. | |
| 2011/0314419 A1 | 12/2011 | Dunn et al. | |
| 2011/0320373 A1 | 12/2011 | Lee et al. | |
| 2012/0028659 A1 | 2/2012 | Whitney et al. | |
| 2012/0033718 A1 | 2/2012 | Kauffman et al. | |
| 2012/0036015 A1 | 2/2012 | Sheikh | |
| 2012/0036443 A1 | 2/2012 | Ohmori et al. | |
| 2012/0054797 A1 | 3/2012 | Skog et al. | |
| 2012/0059722 A1 | 3/2012 | Rao | |
| 2012/0062805 A1 | 3/2012 | Candelore | |
| 2012/0084547 A1 | 4/2012 | Jung | |
| 2012/0084731 A1 | 4/2012 | Filman et al. | |
| 2012/0084835 A1 | 4/2012 | Thomas et al. | |
| 2012/0099800 A1 | 4/2012 | Llano et al. | |
| 2012/0108293 A1 | 5/2012 | Law et al. | |
| 2012/0110096 A1 | 5/2012 | Smarr et al. | |
| 2012/0113143 A1 | 5/2012 | Adhikari et al. | |
| 2012/0113272 A1 | 5/2012 | Hata | |
| 2012/0123830 A1 | 5/2012 | Svendsen et al. | |
| 2012/0123871 A1 | 5/2012 | Svendsen et al. | |
| 2012/0123875 A1 | 5/2012 | Svendsen et al. | |
| 2012/0124126 A1 | 5/2012 | Alcazar et al. | |
| 2012/0124176 A1 | 5/2012 | Curtis et al. | |
| 2012/0124458 A1 | 5/2012 | Cruzada | |
| 2012/0131507 A1 | 5/2012 | Sparandara et al. | |
| 2012/0131512 A1 | 5/2012 | Takeuchi et al. | |
| 2012/0143760 A1 | 6/2012 | Abulafia et al. | |
| 2012/0150978 A1 | 6/2012 | Monaco | |
| 2012/0165100 A1 | 6/2012 | Lalancette et al. | |
| 2012/0166971 A1 | 6/2012 | Sachson et al. | |
| 2012/0169855 A1 | 7/2012 | Oh | |
| 2012/0172062 A1 | 7/2012 | Altman et al. | |
| 2012/0173991 A1 | 7/2012 | Roberts et al. | |
| 2012/0176401 A1 | 7/2012 | Hayward et al. | |
| 2012/0184248 A1 | 7/2012 | Speede | |
| 2012/0197724 A1 | 8/2012 | Kendall | |
| 2012/0200743 A1 | 8/2012 | Blanchflower et al. | |
| 2012/0209924 A1 | 8/2012 | Evans et al. | |
| 2012/0210244 A1 | 8/2012 | De Francisco Lopez et al. | |
| 2012/0212632 A1 | 8/2012 | Mate et al. | |
| 2012/0220264 A1 | 8/2012 | Kawabata | |
| 2012/0226748 A1 | 9/2012 | Bosworth et al. | |
| 2012/0233000 A1 | 9/2012 | Fisher et al. | |
| 2012/0236162 A1 | 9/2012 | Imamura | |
| 2012/0239761 A1 | 9/2012 | Linner et al. | |
| 2012/0250951 A1 | 10/2012 | Chen | |
| 2012/0252418 A1 | 10/2012 | Kandekar et al. | |
| 2012/0254325 A1 | 10/2012 | Majeti et al. | |
| 2012/0278387 A1 | 11/2012 | Garcia et al. | |
| 2012/0278692 A1 | 11/2012 | Shi | |
| 2012/0290637 A1 | 11/2012 | Perantatos et al. | |
| 2012/0299954 A1 | 11/2012 | Wada et al. | |
| 2012/0304052 A1 | 11/2012 | Tanaka et al. | |
| 2012/0304080 A1 | 11/2012 | Wormald et al. | |
| 2012/0307096 A1 | 12/2012 | Ford et al. | |
| 2012/0307112 A1 | 12/2012 | Kunishige et al. | |
| 2012/0319904 A1 | 12/2012 | Lee et al. | |
| 2012/0323933 A1 | 12/2012 | He et al. | |
| 2012/0324018 A1 | 12/2012 | Metcalf et al. | |
| 2013/0006759 A1 | 1/2013 | Srivastava et al. | |
| 2013/0024757 A1 | 1/2013 | Doll et al. | |
| 2013/0036364 A1 | 2/2013 | Johnson | |
| 2013/0045753 A1 | 2/2013 | Obermeyer et al. | |
| 2013/0050260 A1 | 2/2013 | Reitan | |
| 2013/0055083 A1 | 2/2013 | Fino | |
| 2013/0057587 A1 | 3/2013 | Leonard et al. | |
| 2013/0059607 A1 | 3/2013 | Herz et al. | |
| 2013/0060690 A1 | 3/2013 | Oskolkov et al. | |
| 2013/0063369 A1 | 3/2013 | Malhotra et al. | |
| 2013/0067027 A1 | 3/2013 | Song et al. | |
| 2013/0071093 A1 | 3/2013 | Hanks et al. | |
| 2013/0080254 A1 | 3/2013 | Thramann | |
| 2013/0085790 A1 | 4/2013 | Palmer et al. | |
| 2013/0086072 A1 | 4/2013 | Peng et al. | |
| 2013/0090171 A1 | 4/2013 | Holton et al. | |
| 2013/0095857 A1 | 4/2013 | Garcia et al. | |
| 2013/0104053 A1 | 4/2013 | Thornton et al. | |
| 2013/0110885 A1 | 5/2013 | Brundrett, III | |
| 2013/0111514 A1 | 5/2013 | Slavin et al. | |
| 2013/0128059 A1 | 5/2013 | Kristensson | |
| 2013/0129252 A1 | 5/2013 | Lauper | |
| 2013/0132477 A1 | 5/2013 | Bosworth et al. | |
| 2013/0145286 A1 | 6/2013 | Feng et al. | |
| 2013/0155126 A1* | 6/2013 | Lathrop | G09G 5/001 |
| | | | 702/62 |
| 2013/0159110 A1 | 6/2013 | Rajaram et al. | |
| 2013/0159919 A1 | 6/2013 | Leydon | |
| 2013/0169822 A1 | 7/2013 | Zhu et al. | |
| 2013/0173729 A1 | 7/2013 | Starenky et al. | |
| 2013/0182133 A1 | 7/2013 | Tanabe | |
| 2013/0185131 A1 | 7/2013 | Sinha et al. | |
| 2013/0191198 A1 | 7/2013 | Carlson et al. | |
| 2013/0194301 A1 | 8/2013 | Robbins et al. | |
| 2013/0198176 A1 | 8/2013 | Kim | |
| 2013/0218965 A1 | 8/2013 | Abrol et al. | |
| 2013/0218968 A1 | 8/2013 | Mcevilly et al. | |
| 2013/0222323 A1 | 8/2013 | Mckenzie | |
| 2013/0227476 A1 | 8/2013 | Frey | |
| 2013/0232194 A1 | 9/2013 | Knapp et al. | |
| 2013/0263031 A1 | 10/2013 | Oshiro et al. | |
| 2013/0265450 A1 | 10/2013 | Barnes, Jr. | |
| 2013/0267253 A1 | 10/2013 | Case et al. | |
| 2013/0275505 A1 | 10/2013 | Gauglitz et al. | |
| 2013/0290443 A1 | 10/2013 | Collins et al. | |
| 2013/0304646 A1 | 11/2013 | De Geer | |
| 2013/0311255 A1 | 11/2013 | Cummins et al. | |
| 2013/0325964 A1 | 12/2013 | Berberat | |
| 2013/0335546 A1* | 12/2013 | Crane | H04N 23/61 |
| | | | 348/E5.04 |
| 2013/0344896 A1 | 12/2013 | Kirmse et al. | |
| 2013/0346869 A1 | 12/2013 | Asver et al. | |

(56) References Cited

U.S. PATENT DOCUMENTS

| | | |
|---|---|---|
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0075169 A1* | 3/2014 | Andrews .............. G06F 9/4416 |
| | | 713/2 |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0204245 A1* | 7/2014 | Wexler ................ H04N 23/651 |
| | | 348/231.99 |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0368688 A1* | 12/2014 | John Archibald ... H04N 23/611 |
| | | 348/222.1 |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0097980 A1 | 4/2015 | Cucci et al. |
| 2015/0103235 A1* | 4/2015 | Yoshizawa ............... H04N 5/44 |
| | | 348/372 |
| 2015/0116529 A1 | 4/2015 | Wu et al. |
| 2015/0121108 A1 | 4/2015 | Agrawal et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0195442 A1 | 7/2015 | Pacurariu et al. |
| 2015/0213290 A1* | 7/2015 | Kim ........................ G06F 21/81 |
| | | 726/36 |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0187949 A1* | 6/2016 | Sen ................... H04W 52/0277 |
| | | 713/310 |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |
| 2023/0296885 A1 | 9/2023 | Bamberger et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 14/665,964, Corrected Notice of Allowance mailed Mar. 23, 2017", 3 pgs.

"U.S. Appl. No. 14/665,964, Final Office Action mailed Feb. 2, 2016", 29 pgs.

"U.S. Appl. No. 14/665,964, Non Final Office Action mailed Jun. 5, 2015", 21 pgs.

"U.S. Appl. No. 14/665,964, Non Final Office Action mailed Sep. 8, 2016", 27 pgs.

"U.S. Appl. No. 14/665,964, Notice of Allowance mailed Feb. 27, 2017", 12 pgs.

"U.S. Appl. No. 14/665,964, Response filed Oct. 5, 2015 to Non Final Office Action mailed Jun. 5, 2015", 15 pgs.

"U.S. Appl. No. 14/665,964, Response filed Dec. 8, 2016 to Non-Final Office Action mailed Sep. 8, 2016", 14 pgs.

"U.S. Appl. No. 14/744,832, Final Office Action mailed Sep. 23, 2016", 26 pgs.

"U.S. Appl. No. 14/744,832, Non Final Office Action mailed Feb. 2, 2016", 26 pgs.

"U.S. Appl. No. 14/744,832, Notice of Allowance mailed Feb. 7, 2017", 15 pgs.

(56)  References Cited

OTHER PUBLICATIONS

"U.S. Appl. No. 14/744,832, Response filed Jan. 23, 2017 to Final Office Action mailed Sep. 23, 2016", 12 pgs.

"U.S. Appl. No. 14/744,832, Response filed Jul. 5, 2016 to Non Final Office Action mailed Feb. 2, 2016", 12 pgs.

"U.S. Appl. No. 15/620,260, Examiner Interview Summary mailed Nov. 3, 2017", 3 pgs.

"U.S. Appl. No. 15/620,260, Non Final Office Action mailed Jul. 25, 2017", 30 pgs.

"U.S. Appl. No. 15/620,260, Notice of Allowance mailed Dec. 13, 2017", 15 pgs.

"U.S. Appl. No. 15/620,260, Response filed Oct. 25, 2017 to Non Final Office Action mailed Jul. 25, 2017", 12 pgs.

"U.S. Appl. No. 15/926,906, Corrected Notice of Allowability mailed Jan. 10, 2019", 2 pgs.

"U.S. Appl. No. 15/926,906, Non Final Office Action mailed Jul. 3, 2018", 12 pgs.

"U.S. Appl. No. 15/926,906, Notice of Allowance mailed Nov. 30, 2018", 11 pgs.

"U.S. Appl. No. 15/926,906, Response filed Sep. 26, 2018 to Non Final Office Action mailed Jul. 3, 2018", 9 pgs.

"U.S. Appl. No. 16/288,041, Examiner Interview Summary mailed May 18, 2020", 4 pgs.

"U.S. Appl. No. 16/288,041, Final Office Action mailed Feb. 10, 2020", 42 pgs.

"U.S. Appl. No. 16/288,041, Non Final Office Action mailed Jul. 7, 2020", 13 pgs.

"U.S. Appl. No. 16/288,041, Non Final Office Action mailed Jul. 30, 2019", 30 pgs.

"U.S. Appl. No. 16/288,041, Notice of Allowance mailed Nov. 12, 2020", 12 pgs.

"U.S. Appl. No. 16/288,041, Response filed May 8, 2020 to Final Office Action mailed Feb. 10, 2020", 10 pgs.

"U.S. Appl. No. 16/288,041, Response filed Oct. 7, 2020 to Non Final Office Action mailed Jul. 7, 2020", 9 pgs.

"U.S. Appl. No. 16/288,041, Response filed Oct. 24, 2019 to Non-Final Office Action mailed Jul. 30, 2019", 11 pgs.

"U.S. Appl. No. 17/249,048, Non Final Office Action mailed Jun. 25, 2021", 36 pgs.

"U.S. Appl. No. 17/249,048, Notice of Allowance mailed Jan. 6, 2022", 17 pgs.

"U.S. Appl. No. 17/249,048, Response filed Oct. 25, 2021 to Non Final Office Action mailed Jun. 25, 2021", 13 pgs.

"U.S. Appl. No. 17/661,596, Notice of Allowance mailed Jan. 20, 2023", 17 pgs.

"U.S. Appl. No. 17/661,596, Preliminary Amendment filed Sep. 12, 2022", 6 pgs.

"U.S. Appl. No. 18/137,295, Non Final Office Action mailed Mar. 29, 2024", 27 pgs.

"U.S. Appl. No. 18/137,295, Notice of Allowance mailed Aug. 7, 2024", 18 pgs.

"U.S. Appl. No. 18/137,295, Response filed Jul. 1, 2024 to Non Final Office Action mailed Mar. 29, 2024", 9 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report mailed Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RGOw>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

* cited by examiner

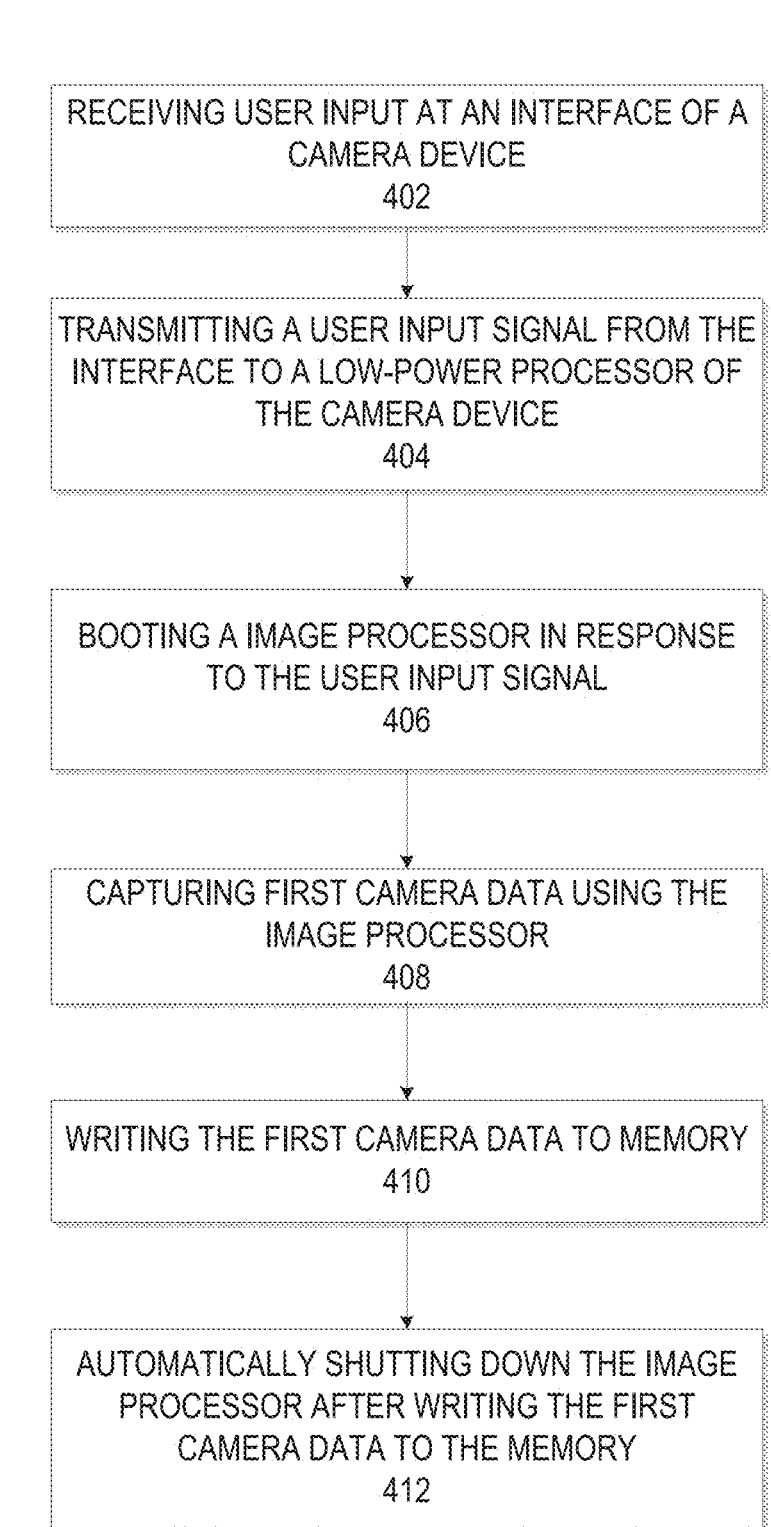

400

RECEIVING USER INPUT AT AN INTERFACE OF A
CAMERA DEVICE
402

TRANSMITTING A USER INPUT SIGNAL FROM THE
INTERFACE TO A LOW-POWER PROCESSOR OF
THE CAMERA DEVICE
404

BOOTING A IMAGE PROCESSOR IN RESPONSE
TO THE USER INPUT SIGNAL
406

CAPTURING FIRST CAMERA DATA USING THE
IMAGE PROCESSOR
408

WRITING THE FIRST CAMERA DATA TO MEMORY
410

AUTOMATICALLY SHUTTING DOWN THE IMAGE
PROCESSOR AFTER WRITING THE FIRST
CAMERA DATA TO THE MEMORY
412

FIG. 4

700

| RECEIVE POWER 704 | ← | OFF STATE 702 | ← | CRITICAL POWER PROCESS 716 |

BOOT LOW-POWER CIRCUITRY 706

701

POWER THRESHOLD CHECK 714 — BELOW / ABOVE

LOW POWER STATE 710

TRACK BATTERY POWER & MAINTAIN LOW POWER WIRELESS COMMUNICATIONS 712

RECEIVE DISPLAY COMMUNICATION FROM APP ON CLIENT DEVICE 720

POWER DOWN HS PROCESSOR 742

BOOT HIGH-SPEED PROCESSOR 722

DISPLAY POWER OFF 740

LOCAL DATA ? 724 — NO

HS PROCESSOR TURNS ON HIGH-SPEED WIRELESS CIRCUITRY 726

DISPLAY PRESENTS DATA FOR SET PERIOD OF TIME 738

YES

CLIENT DEVICE CONNECTS TO HS WIRELESS CIRCUITRY AND TRANSFERS NEW DATA 728

DISPLAY TURNS ON 736

HS PROCESSOR LOADS DATA FOR DISPLAY 734

POWER DOWN HS WIRELESS CIRCUITRY 732

COMPLETE DATA TRANSFER 730

Figure 8:
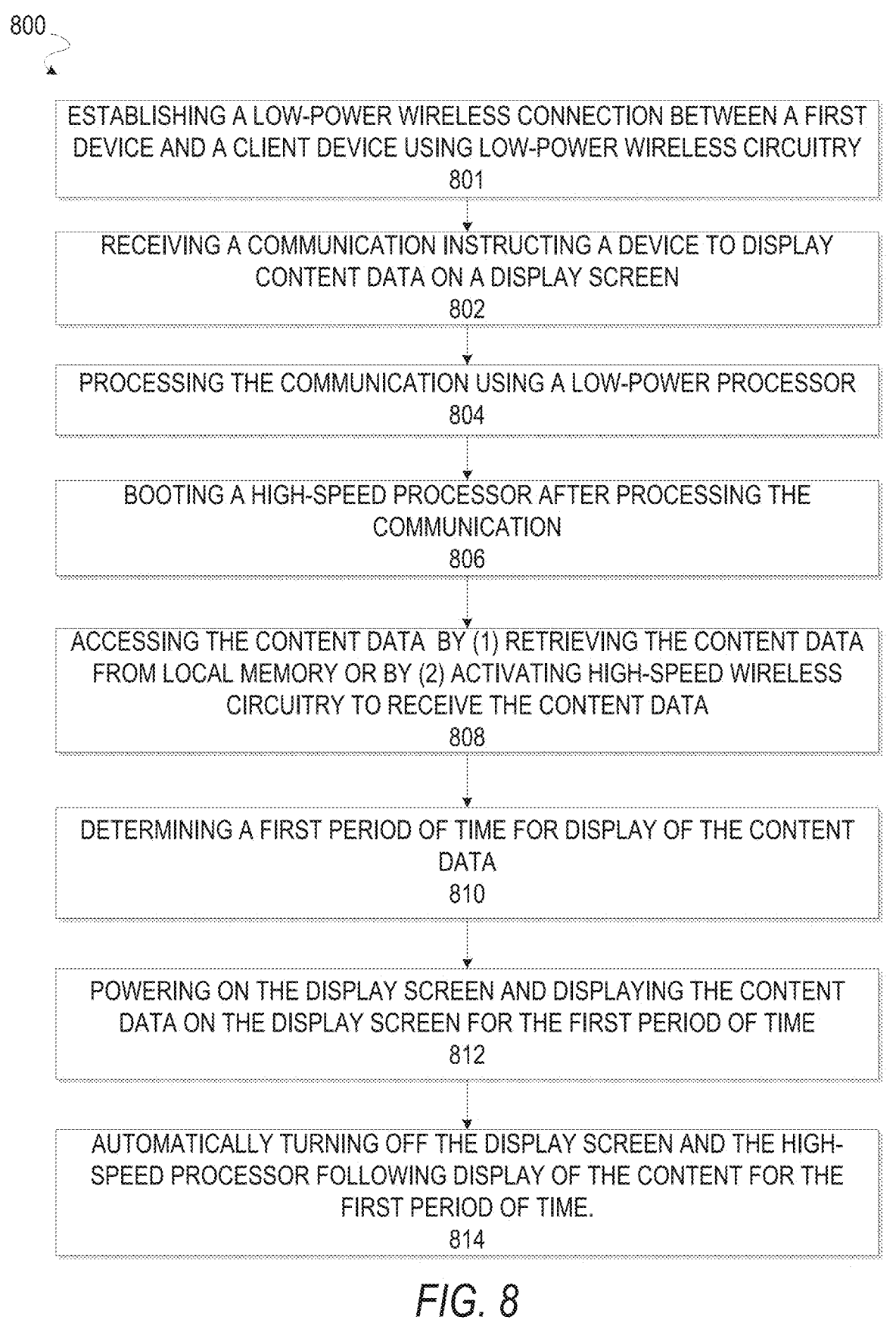

ESTABLISHING A LOW-POWER WIRELESS CONNECTION BETWEEN A FIRST DEVICE AND A CLIENT DEVICE USING LOW-POWER WIRELESS CIRCUITRY
801

RECEIVING A COMMUNICATION INSTRUCTING A DEVICE TO DISPLAY CONTENT DATA ON A DISPLAY SCREEN
802

PROCESSING THE COMMUNICATION USING A LOW-POWER PROCESSOR
804

BOOTING A HIGH-SPEED PROCESSOR AFTER PROCESSING THE COMMUNICATION
806

ACCESSING THE CONTENT DATA BY (1) RETRIEVING THE CONTENT DATA FROM LOCAL MEMORY OR BY (2) ACTIVATING HIGH-SPEED WIRELESS CIRCUITRY TO RECEIVE THE CONTENT DATA
808

DETERMINING A FIRST PERIOD OF TIME FOR DISPLAY OF THE CONTENT DATA
810

POWERING ON THE DISPLAY SCREEN AND DISPLAYING THE CONTENT DATA ON THE DISPLAY SCREEN FOR THE FIRST PERIOD OF TIME
812

AUTOMATICALLY TURNING OFF THE DISPLAY SCREEN AND THE HIGH-SPEED PROCESSOR FOLLOWING DISPLAY OF THE CONTENT FOR THE FIRST PERIOD OF TIME.
814

SOFTWARE ARCHITECTURE 902

APPLICATIONS 910

| HOME 950 | LOCATION 958 | THIRD PARTY APPLICATION 966 |
| CONTACTS 952 | MEDIA 960 | |
| BROWSER 954 | MESSAGING 962 | CAMERA DEVICE APP 967 |
| BOOK READER 956 | GAME 964 | |

API CALLS 912

MESSAGES 914

FRAMEWORKS 908

LIBRARIES 906

| SYSTEM 930 | API 932 | OTHER 934 |

OPERATING SYSTEM 904

| KERNEL 920 | SERVICES 922 | DRIVERS 924 |

MACHINE 1100

| PROCESSORS 1110 | MEMORY 1130 | I/O COMPONENTS 1150 |

REDUCING BOOT TIME AND POWER CONSUMPTION IN DISPLAYING DATA CONTENT

CLAIM OF PRIORITY

This application is a continuation of and claims the benefit of priority of U.S. patent application Ser. No. 18/137,295, filed Apr. 20, 2023, which is a continuation of and claims the benefit of priority of U.S. patent application Ser. No. 17/661, 596, filed May 2, 2022, which application is a continuation of and claims the benefit of priority of U.S. patent application Ser. No. 17/249,048, filed Feb. 18, 2021, which is a continuation of and claims the benefit of priority of U.S. patent application Ser. No. 16/288,041, filed Feb. 27, 2019, which is a continuation of and claims the benefit of priority of U.S. patent application Ser. No. 15/926,906, filed Mar. 20, 2018, which is a continuation of and claims the benefit of priority of U.S. patent application Ser. No. 15/620,260, filed Jun. 12, 2017, which is a continuation of and claims the benefit of priority of U.S. patent application Ser. No. 14/744, 832, filed Jun. 19, 2015, which is a continuation of and claims the benefit of priority of U.S. patent application Ser. No. 14/665,964, filed on Mar. 23, 2015. The contents of these prior applications are considered part of this application, and are hereby incorporated by reference in their entirety.

BACKGROUND

Many wearable display systems are severely constrained by form factor which limits battery size and single charge use time. This is particularly true for glasses with an integrated camera or display and wearable devices that integrate multiple functions using additional sensor or circuitry for other functions, all of which make use of the device battery.

Systems and methods described herein therefore include wearable display systems with improved boot operation and power consumption.

BRIEF DESCRIPTION OF THE DRAWINGS

Various ones of the appended drawings merely illustrate example embodiments of the present disclosure and should not be considered as limiting its scope.

FIG. 4 is a diagram illustrating a method of camera device operation according to some example embodiments.

FIG. 7 is a flow diagram illustrating aspects of camera device operation according to some example embodiments.

FIG. 8 is a flow diagram illustrating a method of camera device operation according to some example embodiments.

DETAILED DESCRIPTION

Figure 1:
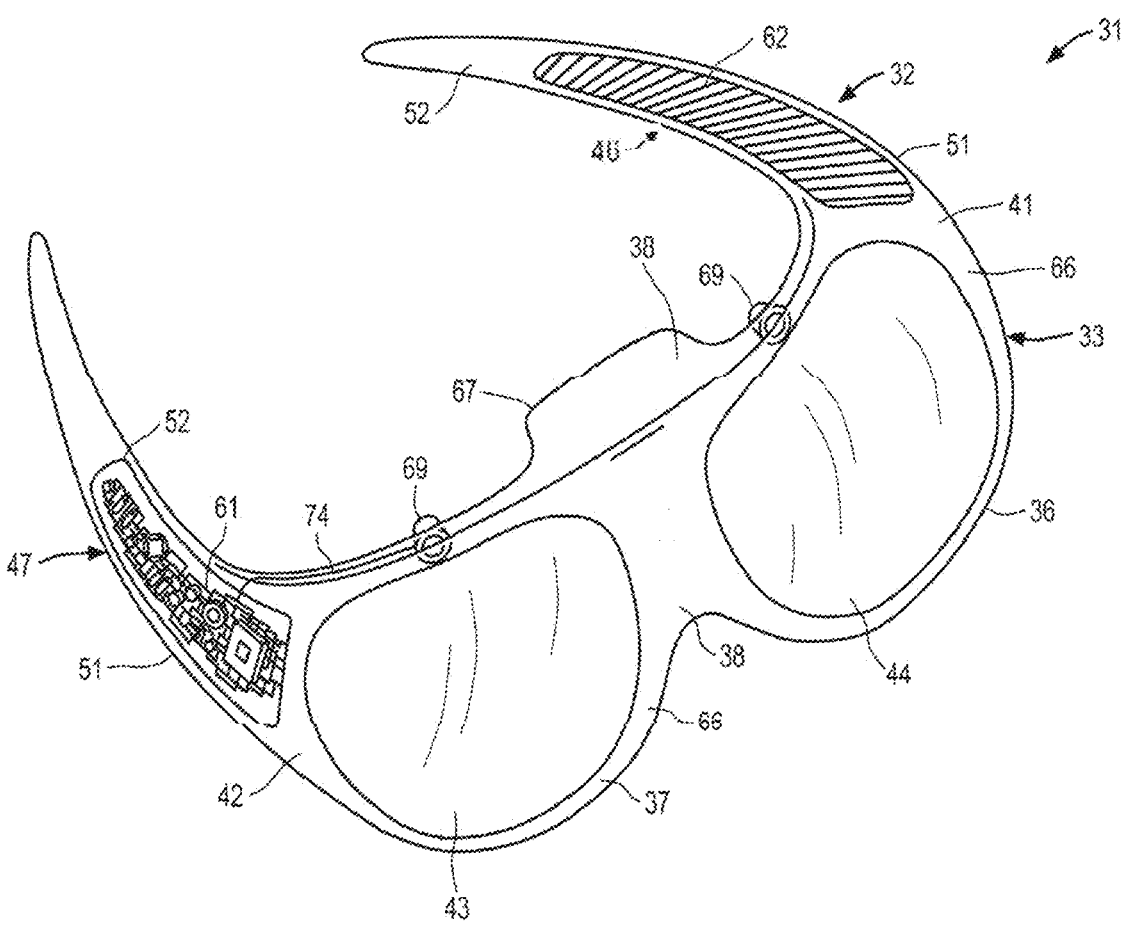
FIG. 1 is a front perspective view of one embodiment of a camera device.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments described herein relate to systems and methods for reducing boot time in a camera system while also lowering power consumption. Certain embodiments described in detail herein include eyeglasses with integrated camera and wireless communication functionality. One example embodiment of such glasses includes a video processor for processing picture and video data from a camera. This camera data can then either be stored locally, or sent wirelessly to a client device such as a smartphone. Such glasses include separate low-power circuitry and high-speed circuitry in addition to the video processor. The low-power circuitry is designed to allow a low-power state, where the video processor and high-speed circuitry are off, and the low-power circuitry is monitoring battery power levels and communications with the user's smartphone or other client devices. Power levels and basic device functionality can be monitored from an application of a smartphone in communication with the glasses. The low-power circuitry is designed to be able to maintain this low-power state of the glasses for weeks on a single battery charge. Low-power state communications using the low-power circuitry may be enabled using a low-power wireless protocol such as Bluetooth™ low energy (Bluetooth LE.) By using a low-power processor and low-power wireless circuitry, the glasses are able to conserve power while maintaining a limited "on" state that avoids certain delays associated with powering on from an "off" state. This low-power "on" state also allows a user's smartphone to connect to the glasses at any time when the glasses have a battery charge.

The glasses of this example embodiment include a single button that allows a user to capture pictures or video. When the button is pressed and released, a picture is taken. When the button is pressed and held, a video is captured for the duration of the button hold. In either case, the low-power processor receives an input signal from the button, and the low-power processor manages the capture of camera data. The low-power processor boots the video processor, and the video processor then captures camera data and writes the camera data to memory. The video processor is then automatically powered off, and the glasses return to a low-power state. In order to enable capture of camera data that is responsive to a user's button press while conserving power, the video processor of this example implementation uses a read only memory (ROM) with direct memory access (DMA) to boot the video processor. Such a video processor can boot from an off state to capturing camera data within 300 milliseconds, and can then be returned to the off state as soon as the camera data is written to memory. This creates a responsive user experience while limiting battery drain.

Similarly, once camera data is captured in this example embodiment, the low-power circuitry manages an energy efficient connection to a client device, and transfer of the camera data to the device. For example, if the camera data is captured when there is no client device nearby, the low-power wireless circuitry may periodically transmit a service set identifier (SSID.) When a smartphone running an application associated with the glasses receives the SSID, the application may automatically request any new camera data from the glasses. The low-power processor verifies that the camera data has not been sent to the smartphone previously; then the low-power processor boots a high-speed processor of the high-speed circuitry. The high-speed processor turns on high-speed wireless circuitry, such as an 802.11 Wi-Fi chip. This high-speed wireless circuitry is then used to transmit the camera data from the memory of the glasses to the smartphone. When the transmission of camera data completes, the high-speed circuitry is automatically powered down, and the glasses return to the low-power state. Just as with the capture of camera data above, the low-power processor manages the high-speed circuitry, which consumes more power, to limit the power consumption by automatically returning the glasses to the low-power state when the data transfer is complete.

If the button on the glasses is pressed during transmission of the camera data, the low-power processor may interrupt the transmission to allow the video processor to boot, capture additional camera data, and power down as described above. The transfer may then be resumed if the smartphone is still in communication with the glasses, or may be resumed later if the connection has been interrupted.

The above example embodiment of glasses with an integrated camera is not limiting, and it will be apparent that many different embodiments are possible in view of the descriptions herein. Certain embodiments may be glasses with only the elements described above, including lenses, a frame, a video processor, high-speed circuitry, low-speed circuitry, a single button, and a battery system, with no other components. Other embodiments may have additional sensors, user interfaces, expanded memory, or any combination of additional elements.

One particular additional embodiment may include a display integrated with glasses. Such an embodiment may operate to conserve power in a manner similar to the operations described above for camera operation and camera data transfer. For example, an example embodiment with a display may operate in a low-power mode, with display elements powered down and low-power circuitry monitoring battery-life and low-power connections with client devices. Such an embodiment may receive a communication via a low-power wireless connection to display media content on the display of the glasses. In response to the communication, the low-power circuitry will initiate a power up and boot of any specified elements, present the media content on the display of the device, and then automatically power down the display and associated circuitry to return to the low-power state after a fixed amount of time. Such operations may be integrated with any other operations and interrupts for any other elements included in the glasses with the display system.

Additionally, certain embodiments may not be glasses, but may be handheld camera devices, clothing attachments, watches, or any other such wearable device configured to capture camera data and communicate the data wirelessly to a client device. Additional details of example embodiments are described below.

FIG. 1 shows aspects of certain embodiments illustrated by a front perspective view of glasses 31. The glasses 31 can include a frame 32 made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly or a combination of the foregoing. Any of the display assemblies disclosed herein can be provided in the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52 for coupling to the ear of the user. In one embodiment the front piece 33 can be formed from a single piece of material, so as to have a unitary or integral construction. In one embodiment, such as illustrated in FIG. 1, the entire frame 32 can be formed from a single piece of material so as to have a unitary or integral construction.

Glasses 31 can include a computing device, such as computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 1, the computer 61 is sized and shaped similar to the size and shape of one of the temple pieces 46, 47 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. As described above, the computer 61 comprises low-power circuitry, high-speed circuitry, and a display processor. Various other embodiments may include these elements in different configurations or integrated together in different ways. Additional details of aspects of computer 61 may be implemented as illustrated by camera device 210 discussed below.

The computer 61 additionally includes a battery 62 or other suitable portable power supply. In one embodiment, the battery 62 is disposed in one of the temple pieces 46 or 47. In the glasses 31 shown in FIG. 1 the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver (not shown) or a combination of such devices.

Glasses 31 include cameras 69. Although two cameras are depicted, other embodiments contemplate the use of a single or additional (i.e., more than two) cameras. In various embodiments, glasses 31 may include any number of input sensors or peripheral devices in addition to cameras 69. Front piece 33 is provided with an outward facing, forward-facing or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices or peripherals can additionally include biometric sensors, location sensors, or any other such sensors.

Figure 2:
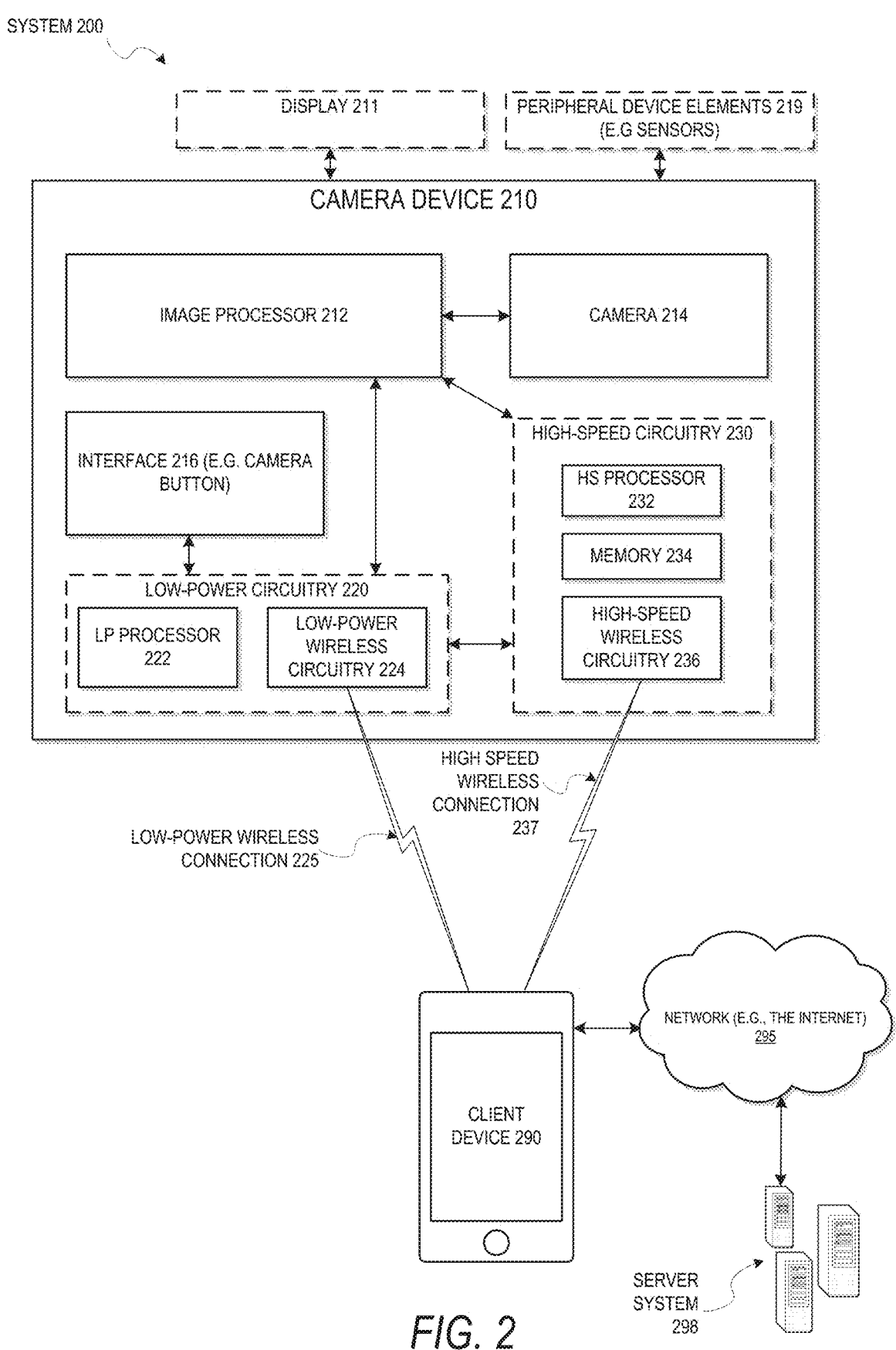
FIG. 2 is a block diagram illustrating a networked system including details of a camera device, according to some example embodiments.

FIG. 2 is a block diagram illustrating a networked system 200 including details of a camera device 210, according to some example embodiments. In certain embodiments, camera device 210 may be implemented in glasses 31 of FIG. 1 described above.

System 200 includes camera device 210, client device 290, and server system 298. Client device 290 may be a smartphone, tablet, phablet, laptop computer, access point, or any other such device capable of connecting with camera device 210 using both a low-power wireless connection 225 and a high-speed wireless connection 237. Client device 290 is connected to server system 298 and network 295. The network 295 may include any combination of wired and wireless connections. Server system 298 may be one or more computing devices as part of a service or network computing system. Client device 290 and any elements of server system 298 and network 295 may be implemented using details of software architecture 902 or machine 1100 described in FIGS. 9 and 11.

System 200 may optionally include additional peripheral device elements 219 and/or a display 211 integrated with camera device 210. Such peripheral device elements 219 may include biometric sensors, additional sensors, or display elements integrated with camera device 210. Examples of peripheral device elements 219 are discussed further with respect to FIGS. 9 and 11. For example, peripheral device elements 219 may include any I/O components 1150 including output components, 1152 motion components 1158, or any other such elements described herein. Example embodiments of a display 211 are discussed in FIGS. 5 and 6.

Camera device 210 includes camera 214, video processor 212, interface 216, low-power circuitry 220, and high-speed circuitry 230. Camera 214 includes digital camera elements such as a charge coupled device, a lens, or any other light capturing elements that may be used to capture data as part of camera 214.

Interface 216 refers to any source of a user command that is provided to camera device 210. In one implementation, interface 216 is a physical button on a camera that, when depressed, sends a user input signal from interface 216 to low power processor 222. A depression of such a camera button followed by an immediate release may be processed by low power processor 222 as a request to capture a single image. A depression of such a camera button for a first period of time may be processed by low-power processor 222 as a request to capture video data while the button is depressed, and to cease video capture when the button is released, with the video captured while the button was depressed stored as a single video file. In certain embodiments, the low-power processor 222 may have a threshold time period between the press of a button and a release, such as 500 milliseconds or one second, below which the button press and release is processed as an image request, and above which the button press and release is interpreted as a video request. The low power processor 222 may make this determination while the video processor 212 is booting. In other embodiments, the interface 216 may be any mechanical switch or physical interface capable of accepting user inputs associated with a request for data from the camera 214. In other embodiments, the interface 216 may have a software component, or may be associated with a command received wirelessly from another source.

Video processor 212 includes circuitry to receive signals from the camera 214 and process those signals from the camera 214 into a format suitable for storage in the memory 234. Video processor 212 is structured within camera device 210 such that it may be powered on and booted under the control of low-power circuitry 220. Video processor 212 may additionally be powered down by low-power circuitry 220. Depending on various power design elements associated with video processor 212, video processor 212 may still consume a small amount of power even when it is in an off state. This power will, however, be negligible compared to the power used by video processor 212 when it is in an on state, and will also have a negligible impact on battery life. As described herein, device elements in an "off" state are still configured within a device such that low-power processor 222 is able to power on and power down the devices. A device that is referred to as "off" or "powered down" during operation of camera device 210 does not necessarily consume zero power due to leakage or other aspects of a system design.

In one example embodiment, video processor 212 comprises a microprocessor integrated circuit (IC) customized for processing sensor data from camera 214, along with volatile memory used by the microprocessor to operate. In order to reduce the amount of time that video processor 212 takes when powering on to processing data, a non-volatile read only memory (ROM) may be integrated on the IC with instructions for operating or booting the video processor 212. This ROM may be minimized to match a minimum size needed to provide basic functionality for gathering sensor data from camera 214, such that no extra functionality that would cause delays in boot time are present. The ROM may be configured with direct memory access (DMA) to the volatile memory of the microprocessor of video processor 212. DMA allows memory-to-memory transfer of data from the ROM to system memory of the video processor 212 independently of operation of a main controller of video processor 212. Providing DMA to this boot ROM further reduces the amount of time from power on of the video processor 212 until sensor data from the camera 214 can be processed and stored. In certain embodiments, minimal processing of the camera signal from the camera 214 is performed by the video processor 212, and additional processing may be performed by applications operating on the client device 290 or server system 298.

Low-power circuitry 220 includes low-power processor 222 and low-power wireless circuitry 224. These elements of low-power circuitry 220 may be implemented as separate elements or may be implemented on a single IC as part of a system on a single chip. Low-power processor 222 includes logic for managing the other elements of the camera device 210. As described above, for example, low power processor 222 may accept user input signals from an interface 216. Low-power processor 222 may also be configured to receive input signals or instruction communications from client device 290 via low-power wireless connection 225. Additional details related to such instructions are described further below. Low-power wireless circuitry 224 includes circuit elements for implementing a low-power wireless communication system. Bluetooth™ Smart, also known as Bluetooth™ low energy, is one standard implementation of a low power wireless communication system that may be used to implement low-power wireless circuitry 224. In other embodiments, other low power communication systems may be used.

High-speed circuitry 230 includes high-speed processor 232, memory 234, and high-speed wireless circuitry 236. High-speed processor 232 may be any processor capable of managing high-speed communications and operation of any general computing system needed for camera device 210. High speed processor 232 includes processing resources needed for managing high-speed data transfers on high-speed wireless connection 237 using high-speed wireless circuitry 236. In certain embodiments, the high-speed processor 232 executes an operating system such as a LINUX operating system or other such operating system such as operating system 904 of FIG. 9. In addition to any other responsibilities, the high-speed processor 232 executing a software architecture for the camera device 210 is used to manage data transfers with high-speed wireless circuitry 236. In certain embodiments, high-speed wireless circuitry 236 is configured to implement Institute of Electrical and Electronic Engineers (IEEE) 802.11 communication standards, also referred to herein as Wi-Fi. In other embodiments, other high-speed communications standards may be implemented by high-speed wireless circuitry 236.

Memory 234 includes any storage device capable of storing camera data generated by the camera 214 and video processor 212. While memory 234 is shown as integrated with high-speed circuitry 230, in other embodiments, memory 234 may be an independent standalone element of the camera device 210. In certain such embodiments, electrical routing lines may provide a connection through a chip that includes the high-speed processor 232 from the video processor 212 or low-power processor 222 to the memory 234. In other embodiments, the high-speed processor 232 may manage addressing of memory 234 such that the low-power processor 222 will boot the high-speed processor 232 any time that a read or write operation involving memory 234 is needed.

Figure 3:
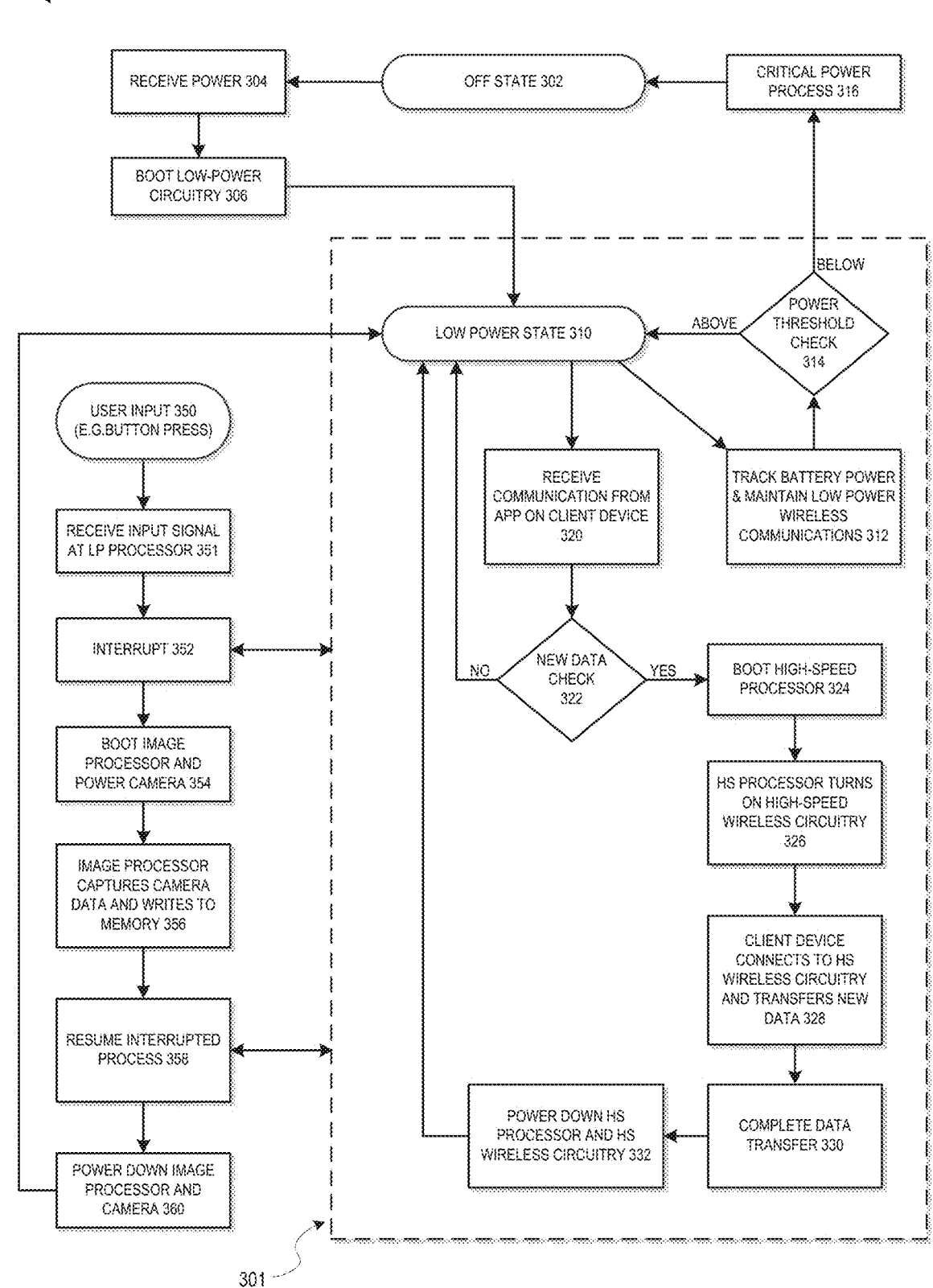
FIG. 3 is a flow diagram illustrating aspects of camera device operation according to some example embodiments.

FIGS. 3 and 4 describe various operations that may be part of methods according to certain embodiments. For clarity and convenience, method 300 of FIG. 3 and method 400 of FIG. 4 will be described with respect to the elements of system 200, and particularly with respect to camera device 210. In various alternative embodiments, other systems and devices may be used to implement methods 300 and 400 and any other methods described herein.

As shown by method 300, a camera device 210 may have an off state 302. Such an off state 302 will occur when a battery or power system of camera device 210 reaches a critically low level. In such an off state 302, none of the elements of camera device 210 have power, and the camera device 210 is unable to communicate with any client device 290. In operation 304, when the camera device 210 is plugged in or otherwise receives a battery charge, the low-power circuitry 220 is booted in operation 306. This places the camera device 210 into low-power state 310.

In low-power state 310, low-power circuitry 220 performs a series of basic device operations. In operation 312, low-power circuitry 220 determines a battery level and maintains any wireless communications using low-power wireless circuitry 224. Any other low-power maintenance operations may also be performed, for example, powering and updating any light emitting diode (LED) status indicators. In operation 314, low-power circuitry 220 performs a power threshold check, comparing the amount of charge in a battery against the threshold. If the battery level is above the power threshold, the low power circuitry 220 will continue performing low-power state 310 operations. If the battery level is below the threshold, then low-power circuitry 220 will manage a complete camera device 210 shutdown in operation 316 to transition the camera device 210 to off state 302. Power processes of operation 316 may include transmitting emergency power alerts to any local client devices 290, managing memory 234 status prior to shut down, or any other such operations to protect the camera device 210 prior to complete loss of power.

In low-power state 310, maintenance operations 312 such as maintaining low power wireless communications may be performed in a variety of different ways. For example, in certain embodiments, low-power circuitry 220 may periodically transmit a service set identifier (SSID) using low-power wireless circuitry 224. Any local client devices 290 with appropriate access may receive the SSID and use this SSID to establish low-power wireless connection 225. In certain embodiments, such a low-power wireless connection 225 may be maintained by an application 910, service 922, or other aspects of a client device such as client 290 implementing software architecture 902 in conjunction with low-power wireless circuitry 224.

Once a connection with client device 290 is established, a variety of communication operations may be performed. Firmware or software updates to the camera device 210 may be received from the client device 290. Additionally, commands may be received at the camera device 210 from an application operating on the client device 290. In one embodiment, when a connection is first established, the establishing of the connection may be taken as a trigger or communication to automatically request a transfer of camera data to the connected client device. Alternatively, a communication may be initiated by the client device 290 or an application operating on client device 290 as part of operation 320.

Once such a communication or automatic check on connection occurs in operation 320, a new data check process 322 is performed by low-power processor 222. Such a check 322 may involve comparing aspects of camera data in memory 234 against the most recent data sent to the client device 290 using details communicated to the camera device 210 in operation 320. Such a check 322 may simply involve a record stored in the memory 234 or another memory location within the camera device 210 that keeps a history of data transfers. In other embodiments, camera data in the memory 234 may automatically be deleted upon transfer to a client device 290, and so the existence of any camera data within the memory 234 may be taken as an indication that new data is present and needs to be transferred to the client device 290 connected to the camera device 210 by low-power wireless connection 225. If no new data is present or identified by the performed check 322, then the camera device 210 simply resumes operations of low-power state 310.

If data to be transferred to client device 290 is identified, then low-power processor 222 initiates a power-on and boot of high-speed processor 232 in operation 324. In operation 326, high-speed processor 232 is then used to power on high-speed wireless circuitry 236. The high-speed processor 232 then uses the high-speed wireless circuitry 236 to establish a high-speed wireless connection 237 with client device 290 in operation 328. Camera data from the memory 234 is then transferred from the camera device 210 to the client device 290. This transfer completes in operation 330, and then in operation 332, the high-speed processor 232 and the high-speed wireless circuitry 236 are both automatically powered down following completion of the data transfer. This power-down process is managed by low-power processor 222, and following this power down in operation 332, the camera device 210 returns to the low-power state 310.

While these operations of low-power state 310 transitioning to a high-power state for an operation at the direction of a client device 290 followed by return to low-power state 310 after completion of the operation are described here only in the context of data transfer, it will be understood that various embodiments may implement additional operations on the camera device 210 which will consume power. A battery of the camera device 210 may be designed to maintain low-power state 310 for several weeks or more. Operations such as the data transfer described above as well as other operations that may begin from low-power state 310 and use additional operations may drain the battery much more quickly than low-power state 310. Any such operations initiated by a client device 290 are considered part of processes 301. According to the embodiment of method 300, any of these processes 301 may be interrupted by a user input signal received from an interface 216.

In state 350, a user input is received at the interface 216 of the camera device 210. One example of a user input is a button press on a button of the camera device 210. This user input at the interface 216 generates a user input signal which is transmitted to the low-power processor 222 in operation 351. In order to provide a responsive experience to a user that generated the action at the interface 216, low power processor 222, upon receiving the input signal, interrupts any of the processes 301 in operation 352. In operation 354, the low-power processor 222 initiates a boot of video processor 212, and camera 214 is provided power. In operation 356, the video processor 212 captures camera data from the camera 214 and writes this camera data to memory 234. The camera data captured from the camera 214 is responsive to the particular user input received at the interface 216. If a picture is requested, operation 356 will capture a signal image. If a video is requested, the capturing of camera data in operation 356 will continue as long as the interface 216 indicates that the user is requesting video, or until the memory 234 is full.

In certain embodiments, if either low-power wireless connection 225 or high-speed wireless connection 237 are present when the amount of free space in memory 234 reaches a sufficiently low level, the low-power processor 222 may attempt to send a warning or error communication to a client device 290. In other embodiments, an audio signal or other indicator signal may provide such a warning on camera device 210.

Once the data capture and writing of the camera data to memory 234 is complete, any interrupted processes of processes 301 are resumed in operation 358. In operation 360, the video processor 212 and the camera 214 are powered down. Camera device 210 then returns to low-power state 310.

FIG. 4 then describes another method, shown as method 400. Method 400 includes a camera data capture process independent of any other operations of the camera device 210. In operation 402, a user input is received at the interface 216 of the camera device 210. In operation 404, a user input signal is transmitted from the interface 216 to the low-power processor 222.

In response to the user input signal received at the low-power processor 222, the video processor 212 is booted in operation 406. In one example embodiment, this boot process involves the low-power processor 222 sending a command to provide power to the video processor 212. The low-power processor 222 will then send a command for a ROM of the video processor 212 to write boot instructions directly to a processor memory of the video processor 212.

The video processor 212 may then capture first camera data from the camera 214 in operation 408. The video processor 212 may then write the first camera data to the memory 234 in operation 410. In operation 412, the low power processor 222 manages the automatic power down of the video processor 212 after the first camera data is written to the memory 234.

Method 400 limits the amount of time from receipt of the input in operation to the capture of camera data in operation 408, while also limiting the amount of time spent with the video processor 212 using power. In certain embodiments, this time period may be 300 milliseconds, or on the order of half a second or less. Such a time delay provides a user with an experience of being able to use an interface when the camera device is in a low power mode, while capturing data in a period of time that is not much longer than the amount of time to press a button. Such a system thus provides a power benefit where power usage is reduced to an extremely low level with a low-power state while still providing the responsiveness of an on state due to the use of the low-power processor 222 to initiate a fast boot of the video processor 212.

As illustrated by method 300, method 400 may then be followed by various other operations. For example, after a capture of the first camera data, any number of additional data captures may be performed until the memory 234 is full. Additionally, a connection with a client device 290 may be made to transfer the first camera data to the client device 290. During such a transfer, if another user input is received, the data transfer may be interrupted for a subsequent capture of additional camera data using operations 402 through 412. After the subsequent camera data capture is complete, the interrupted process is resumed. All of these processes, including camera data capture, data transmission, connection to a client device, and any other such operations, may be managed automatically by low-power processor 222, with the low-power processor 222 automatically shutting down other elements of camera device 210 when each operation is complete in order to reduce power usage and extend the life of a single battery charge.

Figure 5:
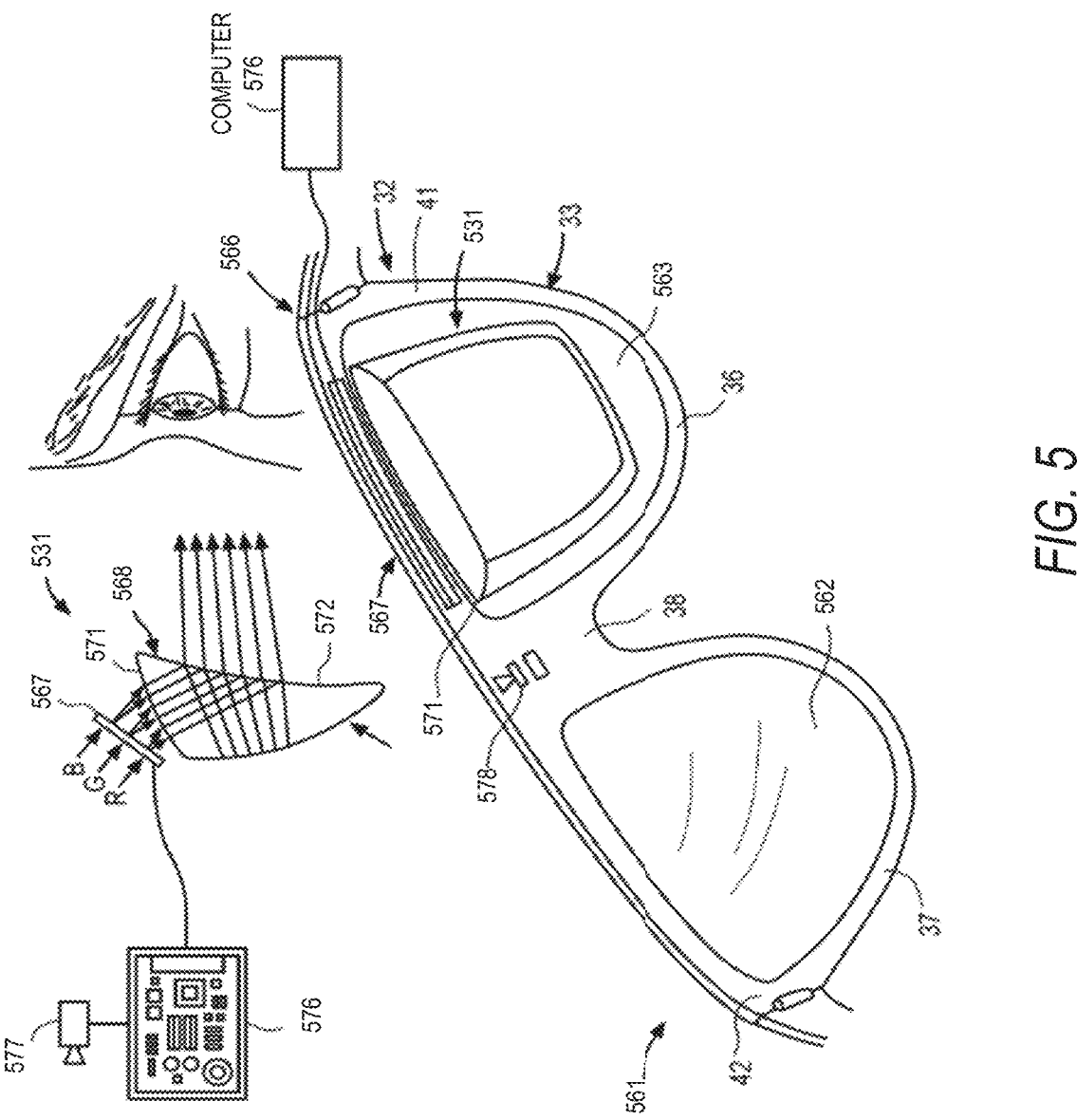
FIGS. 5 and 6 illustrate camera devices including displays according to certain example embodiments.
Figure 6:
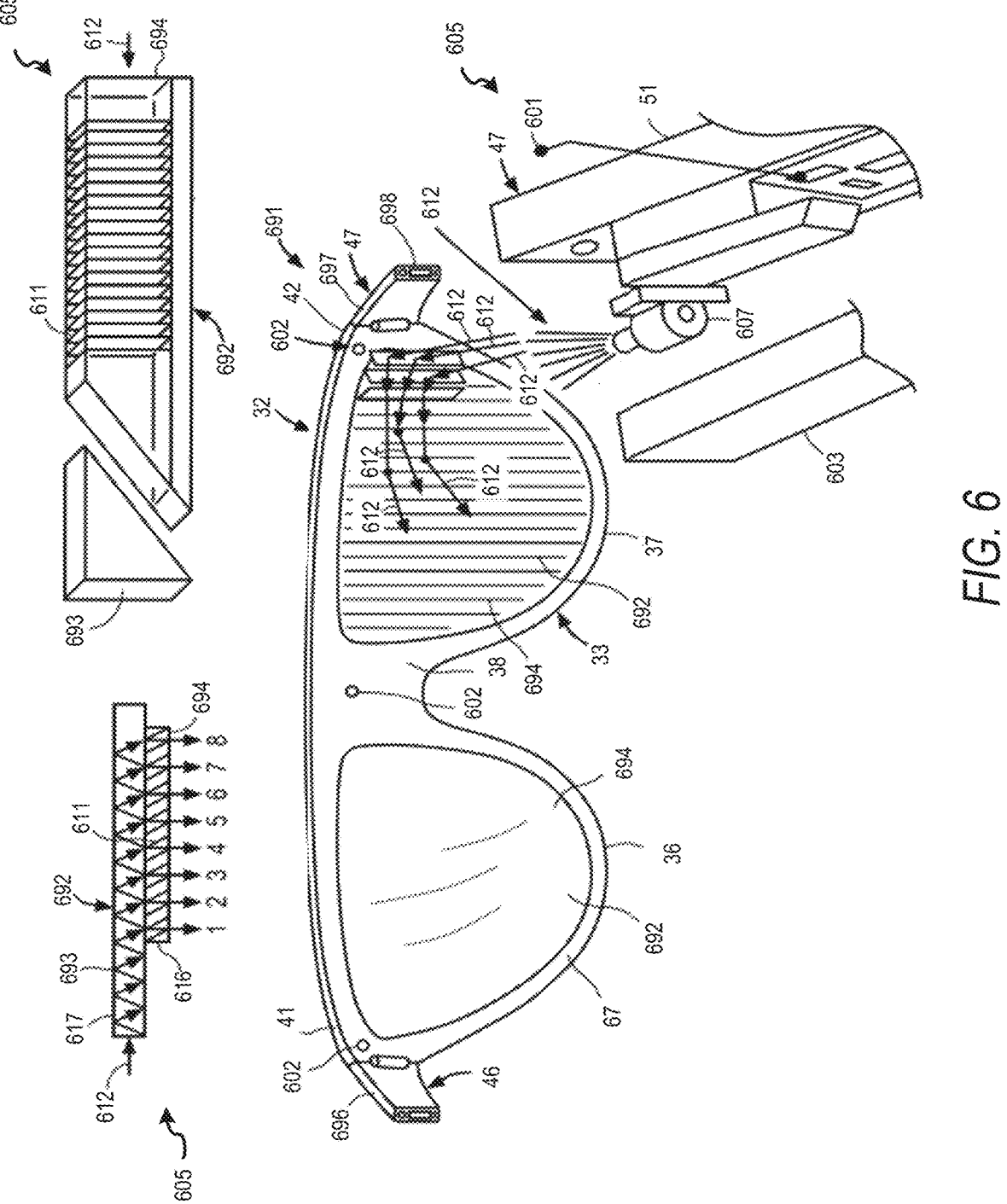

FIGS. 5 and 6 then illustrate two additional embodiments of glasses which include display systems. In various different embodiments, such display systems may be integrated with the camera devices discussed above, or may be implemented as wearable devices without an integrated camera. In embodiments without a camera, power conservation systems and methods continue to operate for the display system and other such systems in a manner similar to what is described above for the video processor and data transfer elements of the camera devices.

FIG. 5 illustrates glasses 561 having an integrated display 531. The glasses 561 can be of any suitable type, including glasses 31, and like reference numerals have been used to describe like components of glasses 561 and 31. For simplicity, only a portion of the glasses 561 are shown in FIG. 5. Headwear or glasses 561 can optionally include left and right optical lenses 562, 563 secured within respective left and right optical element holders 36, 37. The glasses 561 can additionally include any suitable left and right optical elements or assemblies 566, which can be similar to any of the optical elements or assemblies discussed herein including optical elements 43, 44 of glasses 31. Although only one optical assembly 566 is shown in FIG. 5, it is appreciated that an optical assembly 566 can be provided for both eyes of the user.

In one embodiment, the optical assembly 566 includes any suitable display matrix 567. Such a display matrix 567 can be of any suitable type, such as a liquid crystal display (LCD), an organic light-emitting diode (OLED) display, or any other such display. The optical assembly 566 also includes an optical layer or layers 568, which can be include lenses, optical coatings, prisms, mirrors, waveguides, and other optical components in any combination. In the embodiment illustrated in FIG. 5, the optical layer 568 is a prism having a suitable size and configuration and including a first surface 571 for receiving light from display matrix 567 and a second surface 572 for emitting light to the eye of the user. The prism extends over all or at least a portion of the optical element holder 36, 37 so to permit the user to see the second surface 572 of the prism when the eye of the user is viewing through the corresponding optical element holder 36. The first surface 571 faces upwardly from the frame 32 and the display matrix 567 overlies the prism so that photons and light emitted by the display matrix 567 impinge the first surface 571. The prism is sized and shaped so that the light is refracted within the prism and is directed towards the eye of the user by the second surface 572. In this regard, the second surface 572 can be convex so as to direct the light towards the center of the eye. The prism can optionally be sized and shaped so as to magnify the image projected by the display matrix 567, and the light travels through the prism so that the image viewed from the second surface 572 is larger in one or more dimensions than the image emitted from the display matrix 567.

Glasses 561 can include any suitable computing system, including any of the computing devices disclosed herein, such as computer 61 or machine 1100. In the embodiment of FIG. 5, computer 576 powered by a suitable rechargeable battery (not shown), which can be similar to battery 62, is provided. Computer 576 can receive a data stream from one or more image sensors 577, which may be similar to camera 69, with image sensors 577 positioned such that the image sensor 577 senses the same scene as an eye of a wearer of glasses 561. Additional sensors, such as outwardly-facing geometry sensor 578, can be used for any suitable purpose, including the scanning and capturing of three-dimensional geometry that may be used by computer 576 with data from image sensors 577 to provide information via digital display matrix 567.

Computer 576 is implemented using the processor elements of the camera device 210, including video processor 212, high-speed circuitry 230, and low-power circuitry 220. Computer 576 may additionally include any circuitry needed to power and process information for display matrix 567, which may be similar to display 211. In certain embodiments, video processor 212 or high-speed processor 232 may include circuitry to drive display matrix 567. In other embodiments, separate display circuitry may be integrated with the other elements of computer 576 to enable presentation of images on display matrix 567.

FIG. 6 illustrates another example embodiment, shown as glasses 691, having another implementation of a display. Just as with glasses 561, glasses 691 can be of any suitable type, including glasses 31, and reference numerals have again been used to describe like components of glasses 691 and 561. Glasses 691 include optical lenses 692 secured within each of the left and right optical element holders 36, 37. The lens 692 has a front surface 693 and an opposite rear surface 694. The left and right end portions 41,42 of the frame front piece 33 can include respective left and right frame extensions 696, 697 that extend rearward from the respective end portions 41, 42. Left and right temple pieces 46, 47 are provided, and can either be fixedly secured to respective frame extensions 696, 697 or removably attachable to the respective frame extensions 696, 697. In one embodiment, any suitable connector mechanism 698 is provided for securing the temple pieces 46, 47 to the respective frame extension 696, 697.

Glasses 691 includes computer 601, and just as with computer 576, computer 601 may be implemented using the processor elements of camera device 210, including video processor 212, high-speed circuitry 230, and low-power circuitry 220, and computer 601 may additionally include any circuitry needed to power and process information for the integrated display elements.

Sensors 602 include one or more cameras, which may be similar to camera 214 and/or other digital sensors that face outward, away from the user. The data feeds from these sensors 602 go to computer 601. In the embodiment of FIG. 6 the computer 601 is disposed within the first portion 51 of right temple piece 47, although the computer 601 could be disposed elsewhere in alternative embodiments. In the embodiment of FIG. 6, right temple piece 47 includes removable cover section 603 for access to computer 601 or other electronic components of glasses 691.

Glasses 691 include optical elements or assemblies 605, which may be similar to any other optical elements or assemblies described herein. One optical assembly 605 is shown, but in other embodiments, optical assemblies may be provided for both eyes of a user. Optical assembly 605 includes laser projector 607, which is a three-color laser projector using a scanning mirror or galvanometer. During operation, an optical source such as a laser projector is disposed in one of the arms or temples of the glasses, and is shown in right temple piece 47 of glasses 691. The computer 601 connects to the laser projector 607. The optical assembly 605 includes one or more optical strips 611. The optical strips 611 are spaced apart across the width of lens 692, as illustrated by lens 692 in right optical element holder 37 of FIG. 6. In other embodiments, the optical strips 611 may be spaced apart across a depth of the lens 692 between the front surface 693 and the rear surface 694 of lens 692 as shown in the partial view of lens 692 in the top corner of FIG. 6.

During operation, computer 601 sends data to laser projector 607. A plurality of light paths 612 are depicted, showing the paths of respective photons emitted by the laser projector 607. The path arrows illustrate how lenses or other optical elements direct the photons on paths 612 that take the photons from the laser projector 607 to the lens 692. As the photons then travel across the lens 692, the photons encounter a series of optical strips 611. When a particular photon encounters a particular optical strip 611, it is either redirected towards the user's eye, or it passes to the next optical strip 611. Specific photons or beams of light may be controlled by a combination of modulation of laser projector 607 and modulation of optical strips 611. Optical strips 611 may, in certain embodiments, be controlled through mechanical, acoustic, or electromagnetic signals initiated by computer 601.

In one example implementation of the optical strips 611, each strip 611 can use Polymer Dispersed Liquid Crystal to be opaque or transparent at a given instant of time, per software command from computer 601. In a different example implementation of the optical strips 611, each optical strip 611 can have a specific wavelength of light that it redirects toward the user, passing all the other wavelengths through to the next optical strip 611. In a different example implementation of the optical strips 611, each strip 611 can have certain regions of the strip 611 that cause redirection with other regions passing light, and the laser projector 607 can use high precision steering of the light beams to target the photons at the desired region of the particular intended optical strip 611.

In the embodiment of lens 692 illustrated in the top left of FIG. 6, optical strips 611 are disposed in and spaced apart along the width of a first layer 616 of the lens 692, which is secured in a suitable manner to a second layer 617 of the lens 692. In one embodiment, the front surface 693 is formed by the second layer 617 and the rear surface 694 is formed by the first layer 616. The second layer 617 can be provided with reflective coatings on at least a portion of the surfaces thereof so that the laser light bounces off such surfaces so as to travel along the layer 617 until the light encounters a strip 611 provided in the first layer 616, and is either redirected towards the eye of the user or continues on to the next strip 611 in the manner discussed above.

FIG. 7 is a flow diagram illustrating aspects of a camera device operation according to some example embodiments, shown in FIG. 7 as method 700. For the purposes of illustration, just as with method 300 of FIG. 3, method 700 is described with respect to system 200. It will be apparent that other systems, devices, or elements in various different combinations may also be used to implement method 700. Method 700 illustrates off state 702, which may occur when a camera device 210 has no power. When the camera device 210 receives power in operation 704, low-power processor 222 is booted along with low-power wireless circuitry 224 as part of low-power circuitry 220. This places the camera device 210 in low-power state 710. As part of standard operations in low-power state 710, operation 712 includes battery tracking and maintenance of low-power wireless connections 225 with client devices 290, which are in proximity of the camera device 210. If the battery power is below a certain threshold identified in operation 714, shutdown process may occur in operation 716 to return the camera device 210 to off state 702.

During the standard operation 712 of low-power state 710, if the camera device 210 is connected with a client device 290, the camera device 210 may use the low-power processor 222 and low-power wireless circuitry 224 to communicate a battery state to the client device 290. An application operating on the client device 290 may present this battery state information to the user. Similarly, operation 712 may monitor memory 234 details including content present in the memory 234 and an available amount of memory within the memory 234. This information may also be communicated to the client device 290 during low-power state 710 operations of low-power circuitry 220.

In operation 720, the camera device 210 receives a communication from the client device 290 with an instruction to display information on a display 211 of the camera device 210. Such a display communication may be initiated by any application such as any application 910 operating on a client device 290 which is implementing some or all of software architecture 902. For example, location application 958 may include systems for providing map information and directions to a user of client device 290. As part of the operation of the location application 958, visual direction information may be sent to the camera device 210 using camera device application 967. This direction information may be initiated when camera device application 967 and location application 958 determine that a low-power wireless connection 225 exists between the client device 290 and camera device 210. In certain embodiments, user settings input to a user interface of client device 290 may be used to determine when the camera device application 967 will provide such a visual direction information to the camera device 210. Other embodiments may provide visual messages to the camera device 210 using a messaging application 962. Still further embodiments may provide visual game information, book information, web browser information, contacts information, images or videos, or any other such content data as part of any application 910.

After the initial display communication is received from an application operating on client device 290 in operation 720, the low-power processor 222 boots high-speed processor 232 in operation 722. In operation 724, the camera device 210 then determines whether or not the data associated with the display communication is already present in the memory 234 of camera device 210, or whether this information needs to be retrieved. This determination may be made by logic elements of low-power processor 222, by logic operating on high-speed processor 232, or by any other logic operating on the camera device 210. In other embodiments, the initial display communication from the client device 290 may identify a source of the content to be presented on the display 211.

If the camera device 210 determines that the data is not present in the memory 234 or anywhere else on the camera device 210, then in operation 726, the high-speed processor 232 turns on the high-speed wireless circuitry 236. In operation 728, the client device 290 connects to the high-speed wireless circuitry 236 to form high-speed wireless connection 237. Transfer of the data is completed in operation 730 using high-speed wireless connection 237. After the data is transferred, high-speed wireless circuitry 236 is powered down in operation 732. In operation 734, high-speed processor 232 then loads the retrieved data for display in operation 734. Operation 734 will also occur immediately after operation 724 if the camera device 210 determines that the data for display on the display 211 is already present in the memory 234.

In operation 736, the display 211 is powered on. While the method 700 shows operation 736 occurring serially after data is transferred and high-speed wireless circuitry 236 powered down when the data is transferred from client device 290, in certain embodiments, the data may be streamed such that the display 211 turns on in operation 736 and the subsequent display operations occur while data is being transferred from the client device 292 camera device 210 using high-speed wireless connection 237.

After the display 211 is turned on in operation 736, the display 211 presents the data for a set period of time in operation 738. For example, if direction information is being displayed on display 211, the system 200 will determine that the direction information is to be displayed for a fixed period of time, for example five seconds. After the information has been displayed for the predetermined amount of time, the display 211 is automatically powered off in operation 740. The high-speed processor 232 is then powered down in operation 742 after the display of data is complete, and the camera device 210 returns to low-power state 710 where the display 211 is powered down, the high-speed circuitry 230 is powered down, and the low-power circuitry 220 is maintaining low-power wireless communications and battery monitoring as well as any other low-power processes.

In certain embodiments, the set period of time for data display may be determined in conjunction with other applications operating on the client device 290. For example, in the location data embodiment, a positioning system operating on either client device 290 or camera device 210 may determine that the physical location of the user is approaching a location associated with a direction. This may, for example, be an instruction for the user to make a turn or to otherwise follow a set of directions. The location data being presented on the display 211 may include map information or text information prompting the user to follow the path presented by the direction information. Once the user has follow the directions, and the positioning system determines that the direction has been followed, the information displayed on display 211 may be removed, and the system 200 may return to low-power state 710 in response to this determination. In other embodiments, other such triggers from various applications 910 may be used to determine the display time. In each instance, following the display time, the display 211 will be powered down and the camera device 210 will return to low-power state 710.

FIG. 7 further identifies a set of processes 701. As described by method 300, embodiments of method 700 may be interrupted by other priority processes. For example, if the interface 216 receives the user input at any time during any of the processes 701, these processes 701 may be interrupted, with camera data capture prioritized over the processes 701. The method 700 may thus be integrated with any of the operations of method 300, including operations 351 through 360, where the user experience of responsive image or video capture following the button press or another action with a user interface 216 is prioritized over other operations.

FIG. 8 then describes an additional embodiment, shown as method 800. For the purpose of illustration, method 800 is also described with respect to system 200. In other embodiments, method 800 may be implemented using other systems or combinations of any elements described herein in different structures. Method 800 begins with operation 801 establishing a low-power wireless connection 225 between low-power wireless circuitry 224 and client device 290. In operation 802, a communication is received at the camera device 210 instructing the camera device 210 to present content data on the display 211. In operation 804, the communication is processed by low-power processor 222. In response to the processing of the communication, in operation 806, high-speed processor 232 is booted. Content to be presented on the display 211 is identified in operation 808, and is accessed either by retrieving content data from the memory 234 or by activating high-speed wireless circuitry 236 to retrieve the content data from the client device 290 using high-speed wireless connection 237. High-speed processor 232 determines a first period of time for display of content data on display 211. This first period of time may be a predetermined fixed number, or may be determined by sensor data, and the client device 290 is then communicated to camera device 210. In operation 812, display 211 is powered on, and the content data is displayed on the display 211 for the first period of time. After the first period of time, in operation 814 the display 211 and the high-speed processor 232 are powered down.

While the methods described above present operations in a particular order, it will be appreciated that alternate embodiments may operate with certain operations occurring simultaneously or in a different order. In many such embodiments, the order and timing of operations may vary between instances of the operation, with the exact timing managed by a low-power processor such as the low-power processor 222 operating to reduce power usage, and to return the device to a low-power state as quickly as possible.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 9:
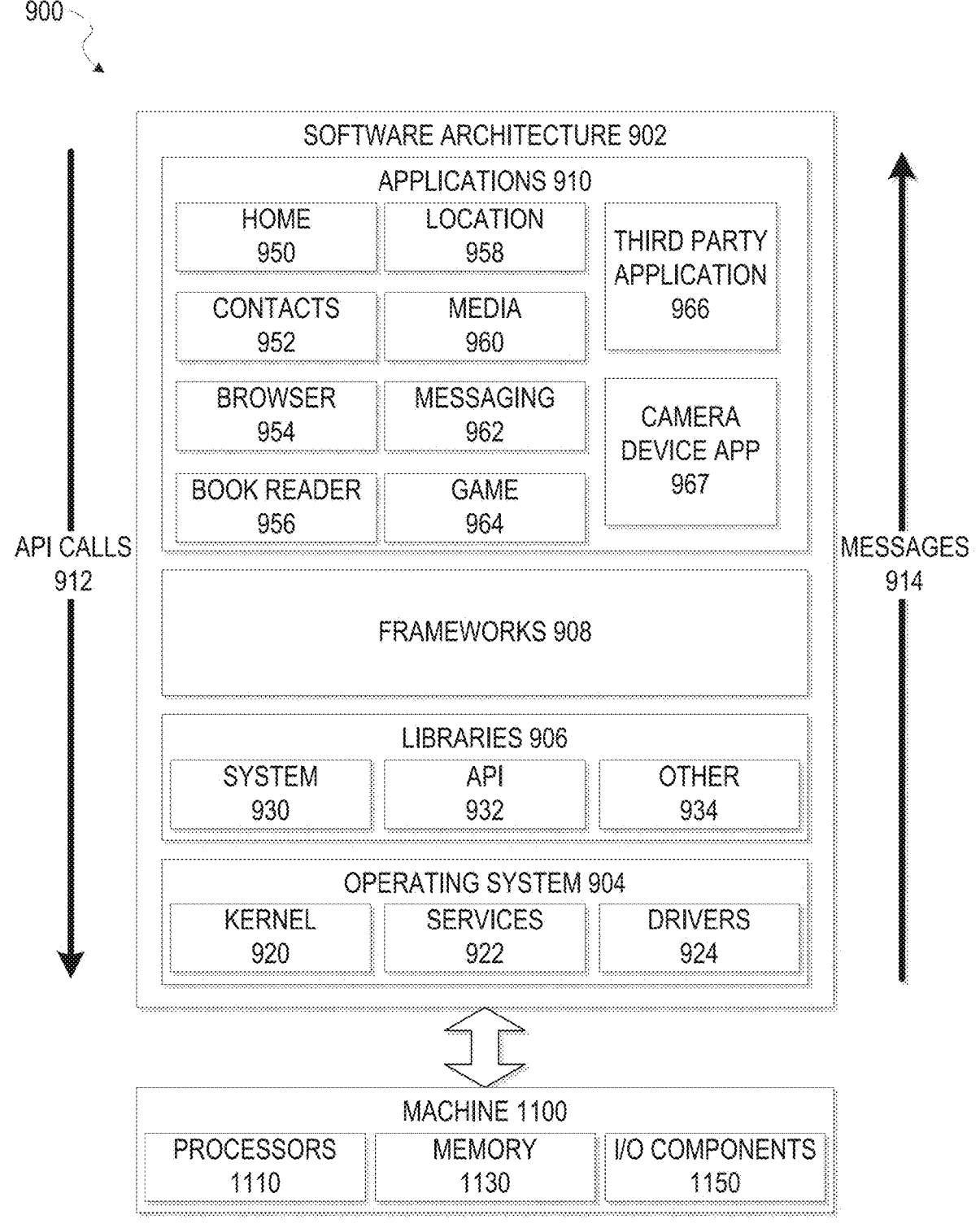
FIG. 9 is a block diagram illustrating an example of a software architecture that may be installed on a machine, according to some example embodiments.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as machine a 1100 of FIG. 11 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device 290, server computer of a server system 298, or any other device described herein may operate using elements of software 902. Devices such as the camera device 210 may additionally be implemented using aspects of software 902, with the architecture adapted for operating using low-power circuitry (e.g., low-power circuitry 220) and high-speed circuitry (e.g., high-speed circuitry 230) as described herein.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the camera device 210, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a camera device application 967. Such an application 967 may interact with I/O components 1150 to establish various wireless connections with devices such as the camera device 210, and to present details of the camera device 210 to a user of the machine 1100. Camera device application 967 may communicate with the camera device 210 to automatically request that camera data be transferred from the camera device 210 to the machine 1100. For example, when camera device application 967 is first opened on the machine 1100, the application 967 may automatically check for the availability of a low-power wireless connection 225 to the camera device 210. If no such connection 225 is available, the camera device application 967 may still provide additional functionality, for example operating as a social network communication application with images or video that have either been previously downloaded from the camera device 210 or captured a camera of client device 290. If, however, low-power wireless connection 225 is available when camera device application 967 is first started, then the camera device application 967 checks to see if files need to be transferred from the camera device 210 to the machine 1100. If not, the camera device application 967 may send a communication over the low-power wireless connection 225 instructing the camera device 210 to maintain a low power state. If camera data is available on the camera device 210 for transfer to the machine 1100, the camera device application 967 checks to see if a high-speed wireless connection 237 is also available to the camera device 210. If no such connection 237 is available, the camera device application 967 may prompt the user to enable such a connection using settings of the machine 1100. The camera device application 967 may then continue checking for the availability of a high-speed wireless connection 237. When such a connection 237 is available on the machine 1100, camera device application 967 sends instructions to the camera device 210 to turn on the high-speed wireless circuitry 236. If a connection is unsuccessful, the camera device application 967 continues attempting to connect via high-speed wireless connection 237, and may instruct the camera device 210 to turn off high-speed wireless circuitry 236 until a new high-speed wireless connection is available. If a connection is successful between the camera device 210 and machine 1100, the data is transferred to the machine 1100 and the camera device application 967 then instructs the camera device 210 to return to a low-power mode. Such a connection method relies on and is controlled by camera device application 967 operating on the machine 1100.

In alternate embodiments, such a connection may be managed and controlled by the camera device 210 communicating with the machine 1100 operating as a client device 290 in a system 200. In such an embodiment, when camera device 210 captures camera data, the data is stored to memory 234, and the low-power processor 222 may check to see if a low-power wireless connection 225 is available. If not, the camera device 210 maintains a low-power state with periodic checks for a low-power wireless connection 225. If a low-power wireless connection 225 is available when a check is performed by low-power processor 222, the low-power processor 222 may communicate a request to client device 290 asking whether low-power processor 222 should turn on high-speed wireless circuitry 236. If no response or a negative response is received from client device 290 operating a camera device application 967, then the camera device 210 maintains a low-power state. If a response is received from camera device application 967 indicating that high-speed wireless circuitry 236 should be turned on, then high-speed processor 232 and high-speed wireless circuitry 236 are turned on. An attempt for a high-speed wireless connection 237 is made. If the attempt to establish the high-speed wireless connection 237 is unsuccessful after a certain number of tries or certain period of time, the camera device 210 will return to a low-power state. If the high-speed wireless connection 237 is successful, the files are transferred, and upon completion of file transfer, the high-speed circuitry 230 is turned off and camera device 210 returns to a low-power state.

Thus, in various embodiments, either a camera device or an associated client device may initiate a data transfer. Additionally, in certain embodiments, the camera device application 967 may work with any other application described herein to manage communication of camera data and display content data with the camera device 210, or to perform various operations compatible with particular embodiments.

Figure 10:
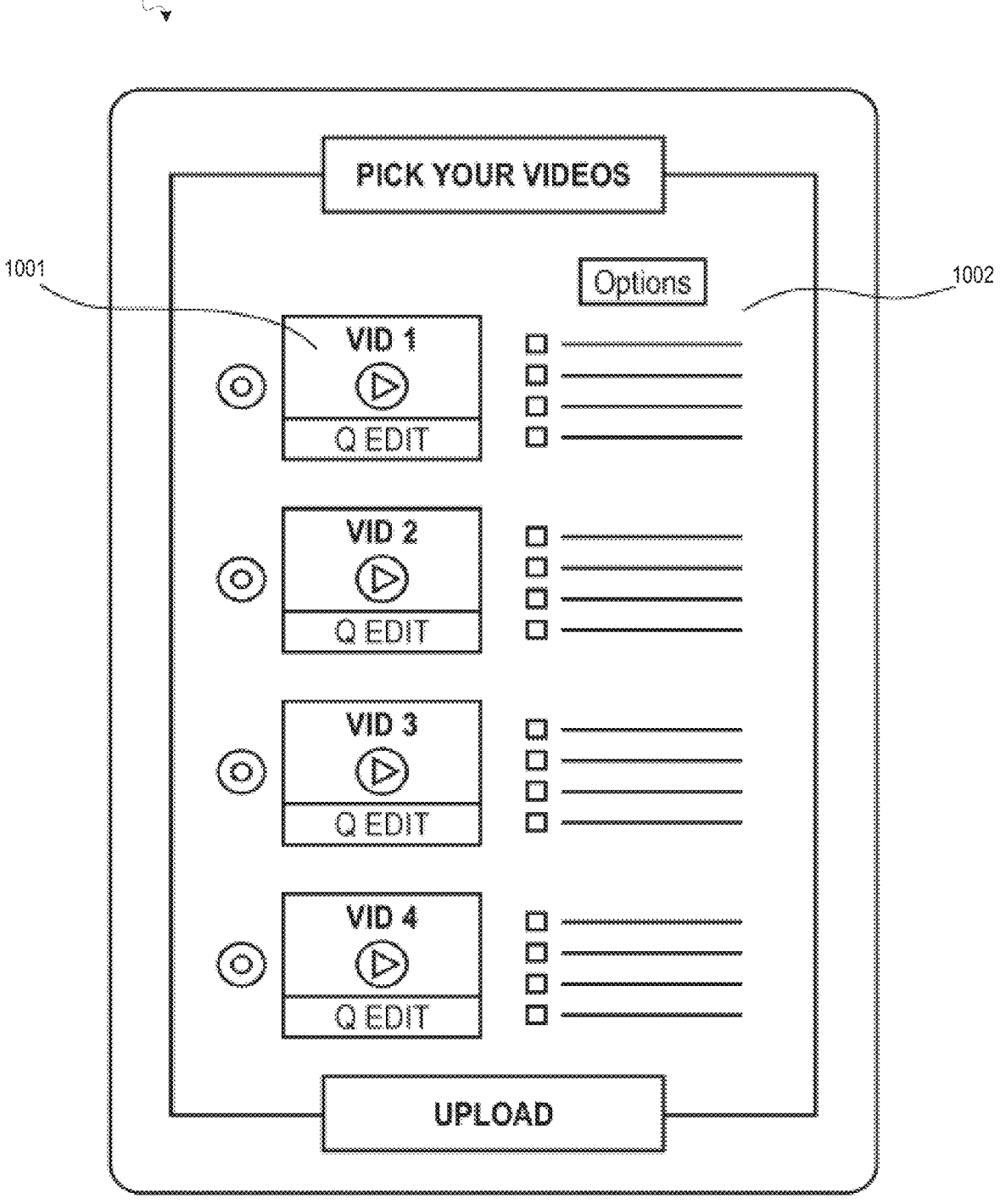
FIG. 10 illustrates an example user interface for a client device operating an application in communication with a separate wirelessly connected camera device according to some example embodiments.

FIG. 10 illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user. For instance, the user may physically touch the mobile device 1000, and in response to the touch, the mobile device 1000 may determine tactile data such as touch location, touch force, or gesture motion. In various example embodiments, the mobile device 1000 displays a home screen operable to launch applications or otherwise manage various aspects of the mobile device 1000. In some example embodiments, the home screen provides status information such as battery life, connectivity, or other hardware statuses. The user can activate user interface elements by touching an area occupied by a respective user interface element. In this manner, the user interacts with the applications of the mobile device 1000. For example, touching the area occupied by a particular icon included in the home screen causes launching of an application corresponding to the particular icon.

Many varieties of applications (also referred to as "apps") can be executing on the mobile device 1000, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app such as SNAPCHAT® that, consistent with some embodiments, allows users to exchange ephemeral messages that include media content. In this example, the social messaging app can incorporate aspects of embodiments described herein.

Such a social messaging application may integrate the functionality of the camera device application 967 to automatically integrate camera data from the camera device 210 into the social messaging application. Mobile device 1000 of FIG. 10 shows an example user interface for display of camera data 1001 from camera device 210 on mobile device 1000. Camera data 1001 is shown as displayed on a screen of mobile device 1000, along with option data 1002. Each content element, including camera data 1001, is displayed on the screen of mobile device 1000 in order. Option data 1002 may include details from camera device 210 such as a date and time of capture, or other information about the images. User interaction with the camera data 1001 on the mobile device 1000 may be used to process or modify the camera data 1001. Swiping up or down on the screen of mobile device 1000 may scroll through different images or videos from camera device 210 or a combination of camera data from camera device 210 and mobile device 1000. Swiping to one side of the display may delete particular camera data 1001, and swiping to the other side may present additional options for communicating the camera data 1001 via a network to other devices or users.

When mobile device 1000 connects with a camera device 210 to download camera data 1001 from the camera device 210, the list of data including camera data 1001 may be updated to include new images and videos from camera device 210. Additionally, the mobile device 1000 may include a user interface that receives status information from the camera device 210, including battery data, memory use data, or any other such status information available from the camera device 210.

Figure 11:
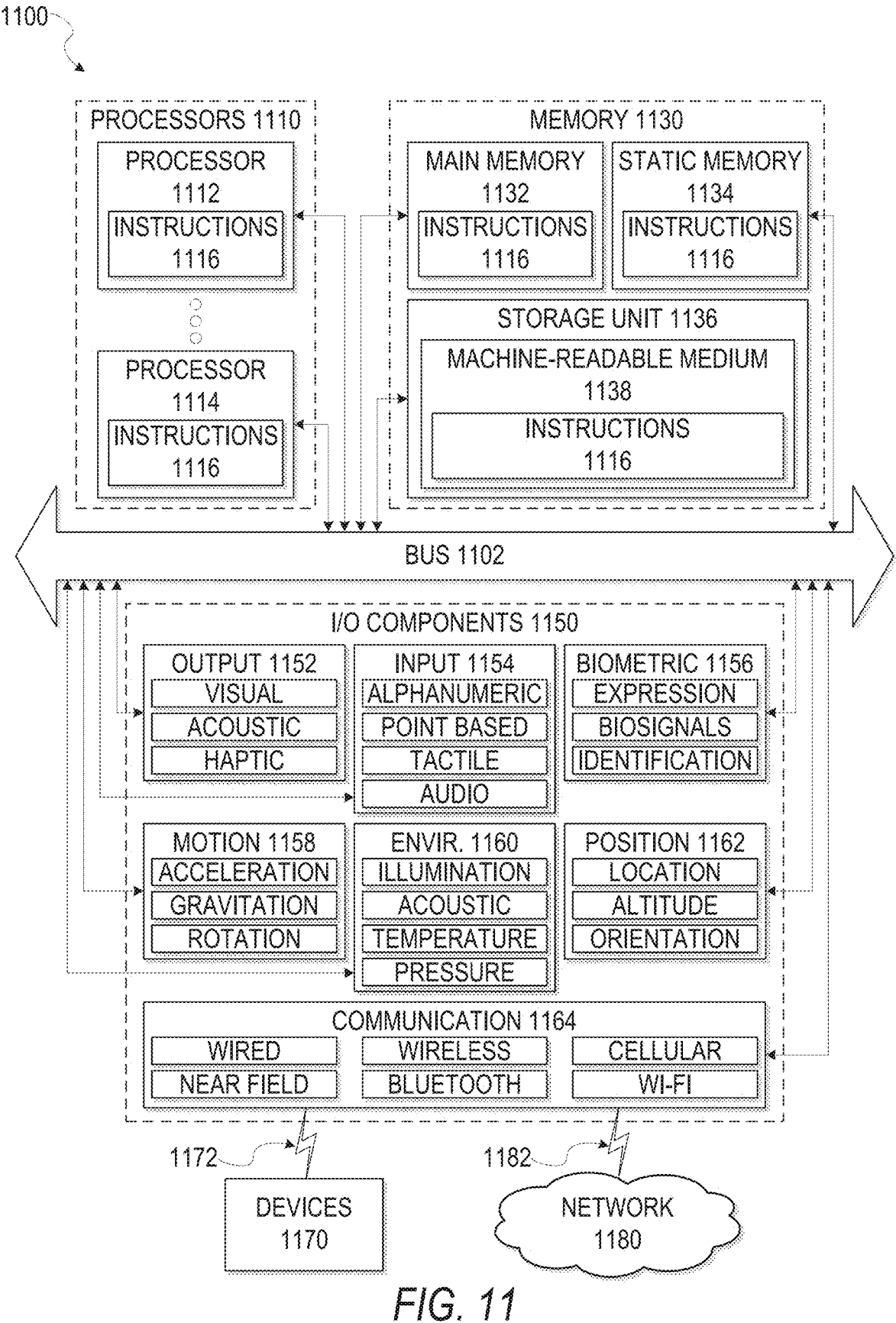
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A device comprising:

processing circuitry coupled to at least one memory;

a display screen coupled to the processing circuitry, wherein the processing circuitry is configured to:

receive, via a wireless connection, content data;

receive, via the wireless connection, an instruction comprising an indication to display the content data;

display the content data on the display screen;

access first location data;

access second location data after accessing the first location data;

determine the first location data indicates to stop displaying the content data based on difference between the first location data and the second location data; and in response to the first location data indicating to stop displaying the content data, stop displaying the content data.

2. The device of claim 1, further comprising:

first wireless circuitry coupled; and second wireless circuitry, wherein the instruction is received via the first wireless circuitry and the content data is received via the second wireless circuitry, and wherein the first wireless circuitry is lower-power wireless circuitry and the second wireless circuitry is higher-power wireless circuitry.

3. The device of claim 2, wherein the device is a first device, and wherein the processing circuitry is further configured to:

in response to the indication to display content data, establish, using the second wireless circuitry, a higher-power wireless connection with a second device, and receive the content data from the second device via the higher-power wireless connection.

4. The device of claim 3, wherein the processing circuitry is further configured to:

establish, using the second wireless circuitry, a lower-power connection; and receive, via the lower-power connection, the instruction.

5. The device of claim 4, wherein the processing circuitry is further configured to:

in response to a failure to establish the higher-power wireless connection, power down the higher-power wireless circuitry, and receive the content data using the first wireless circuitry.

6. The device of claim 1, wherein the instruction is a first instruction, and wherein the processing circuitry is further configured to:

in response to receiving a second instruction, the second instruction indicating to stop displaying the content data, stop displaying the content data.

7. The device of claim 1, wherein the processing circuitry is further configured to:

stop displaying the content data after a fixed period of time.

8. The device of claim 1, the device is a first device, the instruction is received from a second device, and the processing circuitry is further configured to:

access second location data generated by the first device; and send, to the second device via a lower-power wireless connection, the second location data.

9. The device of claim 8, wherein the second device is a client device, and the first device is a mixed reality wearable device.

10. The device of claim 1, wherein the content data comprises visual direction information.

11. The device of claim 10, wherein the visual direction information further comprises an indication of a geographic location.

12. The device of claim 11, wherein the determine the first location data indicates to stop displaying the content data is further based on comparing the geographic location with the first location data.

13. The device of claim 11, and wherein the indication to display content data indicates the device is within a predetermined distance before a location associated with the content data.

14. The device of claim 13, the device is a first device, and wherein the processing circuitry is further configured to:

determine a second location of the first device; and send the second location to a second device, and wherein the receive is in response to sending the second location to the second device.

15. A method comprising:

receiving, via a wireless connection, content data;

receiving, via the wireless connection, an instruction comprising an indication to display the content data;

displaying the content data on a display;

accessing first location data;

accessing second location data after accessing the first location data;

determining the first location data indicates to stop displaying the content data based on difference between the first location data and the second location data; and in response to the first location data indicating to stop displaying the content data, stop displaying the content data.

16. The method of claim 15, wherein the instruction is received via first wireless circuitry and the content data is received via second wireless circuitry, and wherein the first wireless circuitry is lower-power wireless circuitry and the second wireless circuitry is higher-power wireless circuitry.

17. The method of claim 16, further comprising:

in response to the indication to display content data, establish, using the second wireless circuitry, a higher-power wireless connection with a second device, and receive the content data from the second device via the higher-power wireless connection.

18. A non-transitory computer-readable storage medium storing instructions that, when executed by at least one processor, cause the at least one processor to perform operations comprising:

receiving, via a wireless connection, content data;

receiving, via the wireless connection, an instruction comprising an indication to display the content data;

displaying the content data on a display;

accessing first location data;

accessing second location data after accessing the first location data;

determining the first location data indicates to stop displaying the content data based on difference between the first location data and the second location data; and in response to the first location data indicating to stop displaying the content data, stop displaying the content data.

19. The non-transitory computer-readable storage medium of claim 18, wherein the instruction is received via first wireless circuitry and the content data is received via second wireless circuitry, and wherein the first wireless circuitry is lower-power wireless circuitry and the second wireless circuitry is higher-power wireless circuitry.

20. The non-transitory computer-readable storage medium of claim 19, further comprising:

in response to the indication to display content data, establish, using the second wireless circuitry, a higher-power wireless connection with a second device, and receive the content data from the second device via the higher-power wireless connection.

* * * * *